US012649964B2

(12) United States Patent
Ueda et al.

(10) Patent No.: US 12,649,964 B2
(45) Date of Patent: Jun. 9, 2026

(54) WELDED RAIL

(71) Applicant: NIPPON STEEL CORPORATION, Tokyo (JP)

(72) Inventors: Masaharu Ueda, Tokyo (JP); Kenji Saita, Tokyo (JP); Teruhisa Miyazaki, Tokyo (JP); Takuya Tanahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 651 days.

(21) Appl. No.: 18/017,777

(22) PCT Filed: Sep. 21, 2021

(86) PCT No.: PCT/JP2021/034463
§ 371 (c)(1),
(2) Date: Jan. 24, 2023

(87) PCT Pub. No.: WO2022/071007
PCT Pub. Date: Apr. 7, 2022

(65) Prior Publication Data
US 2023/0193438 A1 Jun. 22, 2023

(30) Foreign Application Priority Data
Sep. 30, 2020 (JP) ................................. 2020-165639

(51) Int. Cl.
*C22C 38/32* (2006.01)
*C22C 38/00* (2006.01)
(Continued)

(52) U.S. Cl.
CPC ............ *C22C 38/32* (2013.01); *C22C 38/001* (2013.01); *C22C 38/002* (2013.01);
(Continued)

(58) Field of Classification Search
CPC . E01B 5/02; E01B 11/50; B23K 11/04; C22C 38/32; C22C 38/001; C22C 38/002;
(Continued)

(56) References Cited

U.S. PATENT DOCUMENTS

| | | |
|---|---|---|
| 2012/0015212 A1 | 1/2012 | Karimine et al. |
| 2012/0234806 A1 | 9/2012 | Saita et al. |

FOREIGN PATENT DOCUMENTS

| | | |
|---|---|---|
| JP | 2007-289970 A | 11/2007 |
| WO | 2010/116680 A1 | 10/2010 |

(Continued)

*Primary Examiner* — Robert J McCarry, Jr.
(74) *Attorney, Agent, or Firm* — Rabin & Berdo, P.C.

(57) ABSTRACT

A welded rail according to an aspect of the present invention includes: a plurality of rail portions having a head portion and a web portion and having a height h; and a welded joint portion that joins the rail portions together, in which the rail portion has a predetermined chemical composition, a HAZ width of the welded joint portion is 60 mm or less, in a region of 0 to $(\frac{2}{3}) \times h$ from a head top portion outer surface in a cross section of the welded joint portion which is parallel to a longitudinal direction and an up-down direction of the welded rail and passes through a center of the welded joint portion and of ±5 mm in the longitudinal direction from a welding center, an area ratio of a martensite structure is 0.0006% or more and 0.1000% or less, and in the region, the number of martensite structures having a grain size of 20 to 200 μm is 3 to 80.

4 Claims, 6 Drawing Sheets

(51) Int. Cl.

| | |
|---|---|
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/30* | (2006.01) |
| *E01B 5/02* | (2006.01) |
| *E01B 11/50* | (2006.01) |
| *B23K 11/04* | (2006.01) |

(52) U.S. Cl.
CPC ............ *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *E01B 5/02* (2013.01); *E01B 11/50* (2013.01); *B23K 11/04* (2013.01)

(58) Field of Classification Search
CPC ....... C22C 38/005; C22C 38/02; C22C 38/04; C22C 38/06; C22C 38/20; C22C 38/22; C22C 38/24; C22C 38/26; C22C 38/28; C22C 38/30
See application file for complete search history.

(56) References Cited

FOREIGN PATENT DOCUMENTS

| | | | |
|---|---|---|---|
| WO | 2011/052562 A1 | 5/2011 | |
| WO | WO-2014081246 A1 * | 5/2014 | ............. C22C 38/58 |

* cited by examiner

NUMBER OF MARTENSITE STRUCTURES HAVING GRAIN SIZE OF 20 μm OR MORE
(NUMBER)

WELDED RAIL

TECHNICAL FIELD OF THE INVENTION

The present invention relates to welded rail.

Priority is claimed on Japanese Patent Application No. 2020-165639, filed Sep. 30, 2020, the content of which is incorporated herein by reference.

RELATED ART

Flash butt welding is widely used as a welding method for rails. Flash butt welding is known to have, as its characteristics, advantages such as automation, high quality stability, and a short welding time.

Flash butt welding is a technique of joining rails together by melting end surfaces of the rails by heating and then pressing the melted surfaces into close contact with each other. During the flash butt welding, the rail is heated from room temperature to near its melting point and then cooled. Therefore, the flash butt welding causes changes in a metallographic structure and hardness of the rail. A portion where metallurgical properties, mechanical properties, and the like are changed by heat due to welding, cutting, and the like is called a heat-affected zone (HAZ).

In a portion of the HAZ heated to an A1 point or higher during welding, austenitizing and pearlitic transformation of the metallographic structure occur. Furthermore, in a portion of the HAZ heated to a temperature that is lower than, but close to the A1 point, a pearlite structure, which is the metallographic structure, is decomposed. Accordingly, a decrease in hardness in the HAZ occurs. When a decrease in hardness occurs in a welded rail, wear of the HAZ of a rail head portion due to passing of a wheel is accelerated. Due to a difference in wear rate between the HAZ and a base metal, unevenness is likely to occur in a welded joint portion. Therefore, an excessive load is applied to the welded joint portion during running of a train, increasing a possibility of breakage of the welded rail. Therefore, in flash butt welding of a rail, it is required to narrow a HAZ width of the welded joint portion and to suppress softening in the HAZ. There is a correlation between the HAZ width and the softening of the HAZ, and the softening of the HAZ tends to become significant as the HAZ width increases. Therefore, when the HAZ width is reduced, suppression of the softening of the HAZ is also achieved.

For example, the following techniques have been proposed to narrow the HAZ width.

In Patent Document 1, in flash welding of rails, in order to reduce a HAZ width in a rail longitudinal direction, a backing plate that has a length of 15 mm or more in the rail longitudinal direction on a head top surface and has a thickness of 10 mm or more in a portion in contact with the head top surface is set in a range of 20 mm to 50 mm from a rail end surface before welding, thereafter flash butt welding of the rails is performed, thereby achieving a HAZ width (rail longitudinal direction) of 15 mm or less in a welded joint having a reduced hardness.

In Patent Document 2, a flash butt welding method is described in which, in flash welding of rails, in order to reduce a HAZ width in a rail longitudinal direction, a later flash speed is set to 2.1 mm/sec or faster, and a rail welded joint having a HAZ width of 27 mm or less and a softened width of 10 mm or less is realized.

In Patent Document 3, a method of cooling a rail weld is disclosed, the method including: a first web portion cooling step of cooling a web portion cooling region in a rail weld in at least a part of a temperature range until transformation from austenite to pearlite is completed; a second web portion cooling step of cooling the web portion cooling region after an entirety of a web portion in the rail weld is transformed into pearlite; a foot portion cooling step of cooling a foot portion in the rail weld; and a head portion cooling step of cooling a head portion in the rail weld, in which, when a cooling time in the first web portion cooling step and the second web portion cooling step is indicated as t (minutes), a k value satisfies an inequation given by $-0.1t+0.63 \le k \le -0.1t+2.33$.

PRIOR ART DOCUMENT

Patent Document

[Patent Document 1] Japanese Unexamined Patent Application, First Publication No. 2007-289970
[Patent Document 2] PCT International Publication No. WO2011/052562
[Patent Document 3] PCT International Publication No. WO2010/116680

DISCLOSURE OF THE INVENTION

Problems to be Solved by the Invention

However, in a method of attaching a backing plate as in Patent Document 1, it is necessary to attach a separately prepared backing plate to a specified range. However, since a portion where the backing plate is disposed is very close to an abutment end surface of the rail, scattering molten metal locks to the backing plate. Therefore, in the method of Patent Document 1, it is not easy to attach and detach the backing plate, and moreover, it takes time and effort to remove the metal locking to the backing plate. Therefore, the method of Patent Document 1 has a problem of impairing an efficiency of flash butt welding, which is automated and has high welding efficiency. In addition, the technique described in Patent Document 1 is mainly intended to reduce unevenness of a welded joint portion, and does not consider improving fatigue damage resistance and breakage resistance of the welded joint portion. Furthermore, in the technique described in Patent Document 1, since the rail is cooled using the backing plate, a martensite structure that reduces toughness of the welded joint portion is likely to be generated, so that there is a problem in that there is an increasing probability of breakage of the rail or the like.

Patent Document 2 is mainly intended to reduce unevenness of a welded joint portion due to wear, and is not intended to improve fatigue damage resistance and breakage resistance of a rail welded joint portion. In addition, under welding conditions as shown in Patent Document 2, in a case where the HAZ width is reduced, a coarse martensite structure that reduces toughness is likely to be generated in the rail welded joint portion, and there is a problem that there is an increasing probability of breakage of the rail or the like.

A main purpose of the technique described in Patent Document 3 is to reduce residual stress in a rail after flash butt welding. Reducing the HAZ width is not the object of the technique described in Patent Document 3. In addition, when flash butt welding is performed to narrow the HAZ width, a temperature gradient from a rail base material portion to the rail weld becomes steeper, and the residual stress in the rail after welding increases. Therefore, it is not easy to narrow the HAZ width in the technique of Patent Document 3.

In addition, in the flash butt welding of the rail, a cooling rate of a welded joint portion after welding is high. For this reason, a martensite structure with low toughness is likely to be generated at the welded joint portion. In particular, a martensite structure is generated in an alloy segregation part inside a rail head portion and in the web portion. It is known that rail breakage occurs when a martensite structure is generated in a pearlite structure. Therefore, the amount of generated martensite structure in the welded joint portion is regulated by rail standards (for example, "CN SPECIFICATION FOR THE MANUFACTURE OF STEEL RAIL" by Canadian National Railway Company, Aug. 8, 2006, 12-16D). However, harmfulness of this martensite structure has not been clearly evaluated so far, and the harmfulness has not been quantitatively evaluated.

The present invention has been devised in view of the problems described above, and an object thereof is to improve fatigue damage resistance and breakage resistance in a welded joint portion of a welded rail. Preferably, an object thereof is to provide a rail that can satisfy a demand for extremely severe fatigue damage resistance and breakage resistance in a flash butt welded joint portion of a rail of freight railways, which are subjected to severe track environments.

Means for Solving the Problem

The gist of the present invention resides in a rail described below.

(1) A welded rail according to an aspect of the present invention includes: a plurality of rail portions having a head portion and a web portion and having a height h; and a welded joint portion that joins the rail portions together, in which the rail portion contains, as a chemical composition, by unit mass %, C: 0.75% to 1.20%, Si: 0.10% to 2.00%, Mn: 0.10% to 2.00%, Cr: 0.10% to 1.50%, P<0.0250%, S≤0.0250%, Mo: 0% to 0.50%, Co: 0% to 1.00%, B: 0% to 0.0050%, Cu: 0% to 1.00%, Ni: 0% to 1.00%, V: 0% to 0.50%, Nb: 0% to 0.0500%, Ti: 0% to 0.0500%, Mg: 0% to 0.0200%, Ca: 0% to 0.0200%, REM: 0% to 0.0500%, N: 0% to 0.0200%, Zr: 0% to 0.0200%, Al: 0% to 1.00%, and a remainder consisting of Fe and impurities, a HAZ width of the welded joint portion is 60 mm or less, in a region of 0 to ($\frac{2}{3}$)×h from a head top portion outer surface in a cross section of the welded joint portion which is parallel to a longitudinal direction and an up-down direction of the welded rail and passes through a center of the welded joint portion and of ±5 mm in the longitudinal direction from a welding center, an area ratio of a martensite structure is 0.0006% to 0.1000%, and in the region, the number of martensite structures having a grain size of 20 to 200 μm is 3 to 80.

(2) In the welded rail according to (1), a Cr segregation degree in the region of the welded joint portion may be 2.00 or less.

(3) In the welded rail according to (1) or (2), the rail portion may further contain one or more of, as the chemical composition, by unit mass %, Mo: 0.01% to 0.50%, Co: 0.01% to 1.00%, B: 0.0001% to 0.0050%, Cu: 0.01% to 1.00%, Ni: 0.01% to 1.00%, V: 0.01% to 0.50%, Nb: 0.0010% to 0.0500%, Ti: 0.0030% to 0.0500%, Mg: 0.0005% to 0.0200%, Ca: 0.0005% to 0.0200%, REM: 0.0005% to 0.0500%, N: 0.0020% to 0.0200%, Zr: 0.0001% to 0.0200%, and Al: 0.0100% to 1.00%.

4

Effects of the Invention

According to the above aspect of the present invention, it is possible to improve fatigue damage resistance and breakage resistance of the welded joint portion of the welded rail.

EMBODIMENTS OF THE INVENTION

A welded rail excellent in fatigue damage resistance and breakage resistance according to an embodiment of the present invention will be described in detail. Hereinafter, mass % in compositions is simply described as %.

First, terms used in the present embodiment will be described.

Figure 1A:
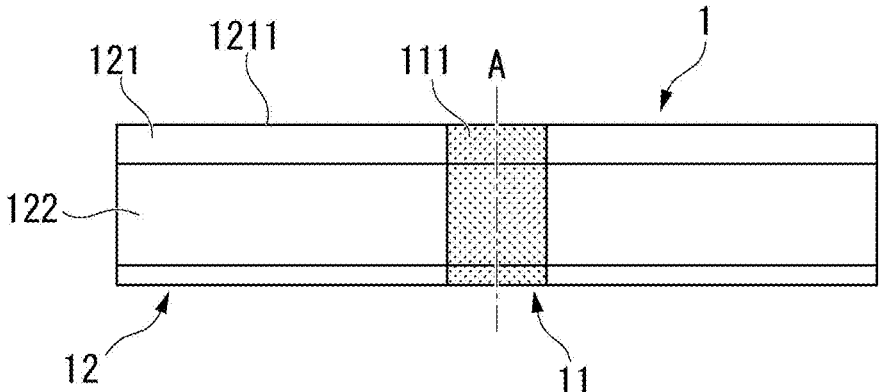
FIG. 1A is a side view of a welded rail.
Figure 2:
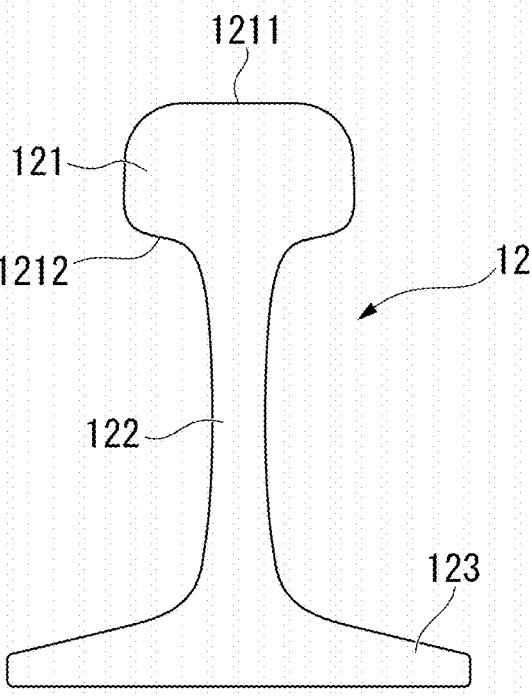
FIG. 2 is a cross-sectional view perpendicular to a longitudinal direction of a rail portion of the welded rail.

As shown in FIGS. 1A and 2, a welded rail 1 includes a plurality of rail portions 12 having head portions 121 and web portions 122, and a welded joint portion 11 that joins the rail portions 12 together. In addition, reference numeral "A" in FIG. 1A denotes a welding center described later. For convenience, a rail before welding is simply referred to as a "rail" and is distinguished from a welded rail. That is, a "rail" means a rail before welding without the welded joint portion 11, a "welded rail" is a rail after welding with the welded joint portion 11, and a "rail portion" is a portion of the welded rail 1 other than the welded joint portion 11.

A rail head portion (or head portion) 121 refers to a portion above a constricted portion at a center of the rail portion 12 in an up-down direction in a cross section of the rail portion 12 shown in FIG. 2. In addition, a rail web portion (or web portion) 122 refers to the constricted portion at the center of the rail portion 12 in the up-down direction in the cross section of the rail portion 12 shown in the figure. Furthermore, a rail foot portion (or foot portion) 123 refers to a portion below the constricted portion at the center of the rail in the up-down direction in the cross section of the rail portion 12 shown in the figure. An outer surface of an upper portion of the rail head portion 121 is referred to as a head top surface, or a rail head top portion outer surface 1211. A constricted portion of a lower portion of the rail head portion 121 is referred to as a rail jaw portion (or jaw portion) 1212.

As a matter of course, an up-down direction of the welded rail 1 means an up-down direction when the welded rail 1 is used as a track.

The welded joint portion 11 is a "welded joint" defined in JIS Z 3001-1:2018, and means a connection portion where members are welded together. The welded joint portion 11 includes a heat-affected zone (HAZ) 111. In the present embodiment, the member is a rail that is a material of the rail portion 12. In addition, in the welded rail 1, a shape of the welded joint portion 11 is substantially the same as that of the rail portion 12. Therefore, the welded joint portion 11 also has a shape having points corresponding to a head portion and a web portion, similarly to the rail portion 12.

Figure 5A:
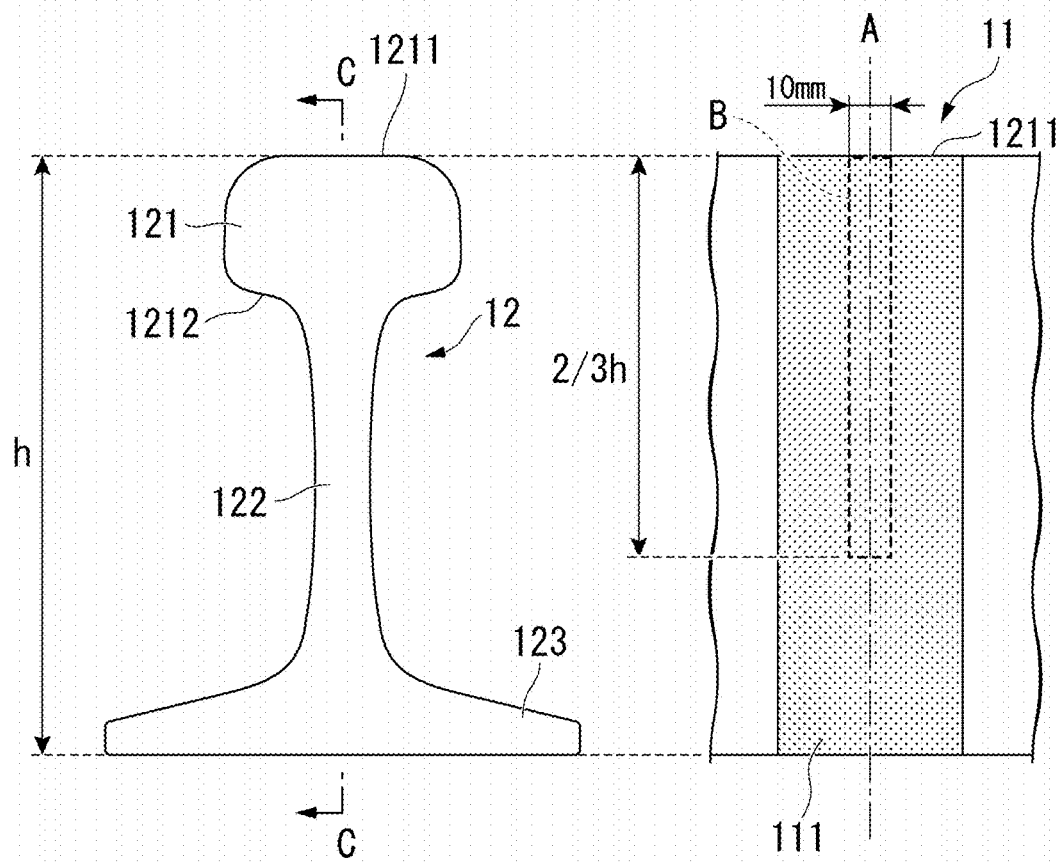
FIG. 5A is a longitudinal cross-sectional view of a welded joint portion of the welded rail and a C-C cross-sectional view of the welded joint portion of the welded rail.
Figure 5B:
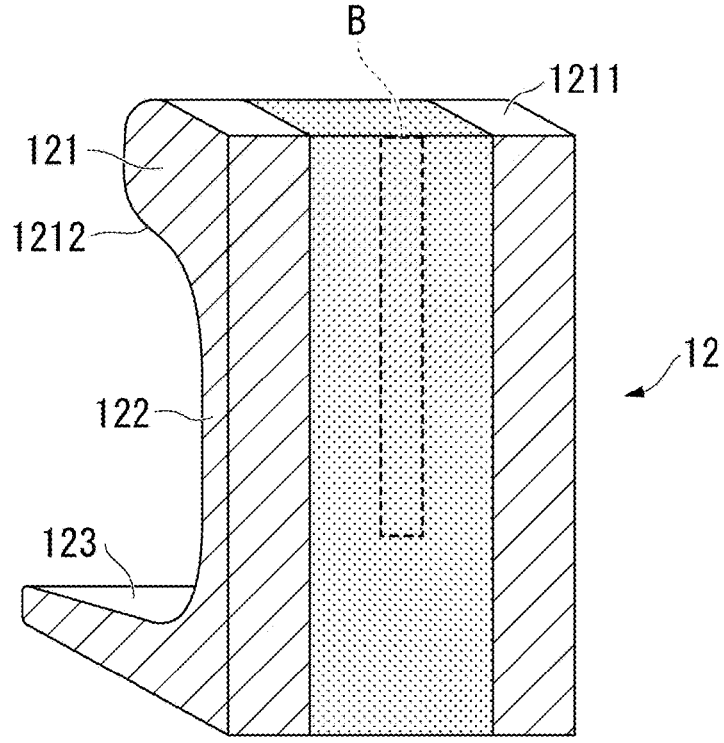
FIG. 5B is a perspective view of the longitudinal cross section and the welded joint portion.

A longitudinal cross section of the welded joint portion 11 is a cross section of the welded joint portion 11 and a periphery thereof which is parallel to a longitudinal direction and the up-down direction of the welded rail 1 and passes through a center of the welded joint portion 11. FIGS. 5A and 5B show schematic views of the longitudinal cross section of the welded joint portion 11.

Figure 1B:
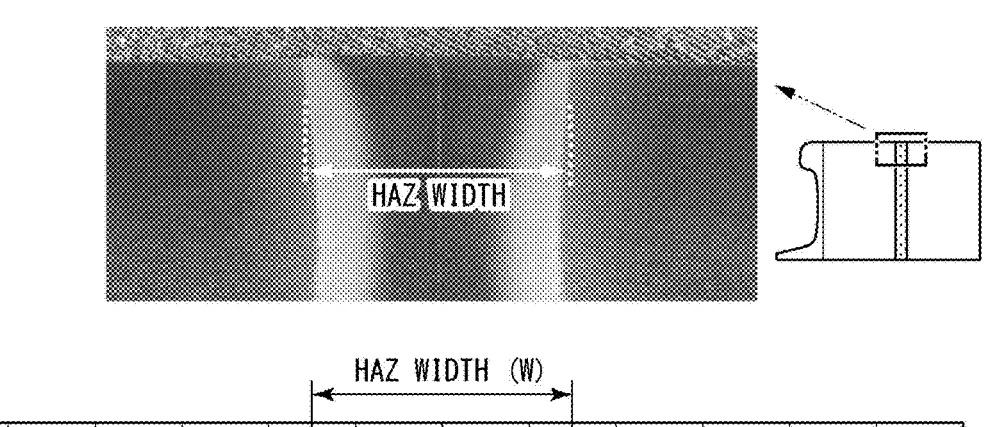
FIG. 1B is an example of a hardness distribution in a longitudinal cross section of the welded rail.
Figure 1B:
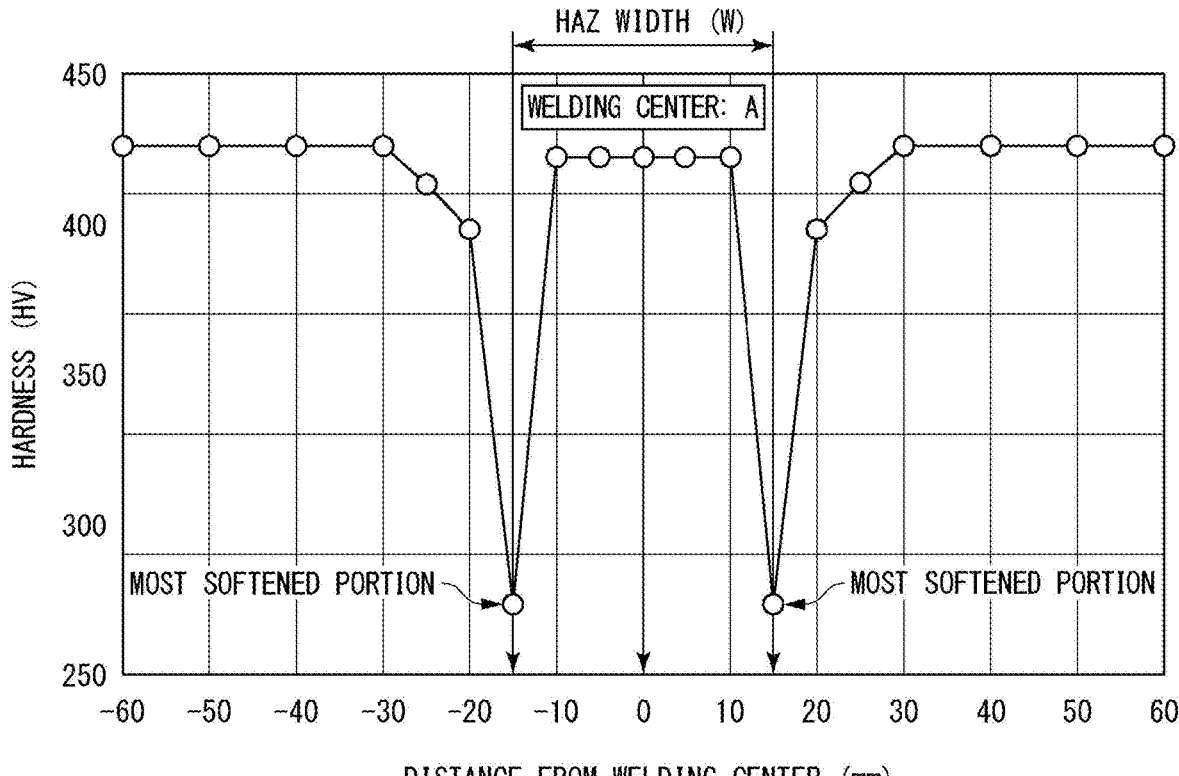

The heat-affected zone 111 (HAZ) means a region between most softened portions shown in FIG. 1B in the welded rail according to the present embodiment. FIG. 1B is an example of a graph of a hardness distribution in a longitudinal cross section in the longitudinal cross section of the welded joint portion 11 of the welded rail, which is obtained by continuously measuring hardnesses of positions 5 mm below the rail head top portion outer surface 1211 of the welded joint portion 11 along the longitudinal direction of the welded rail. Usually, in a graph of a hardness distribution of a welded rail obtained by flash butt welding, two valleys appear on both side of a rail seam. Softest portions on the left and right sides of the rail seam are defined as most softened portions of the welded joint portion 11. The region between the two most softened portions is defined as the heat-affected zone (HAZ) 111. A distance between the two most softened portions measured along the longitudinal direction of the welded rail is defined as a HAZ width W. A region that is discolored after etching the longitudinal cross section of the welded joint portion 11 using nital generally coincides with the HAZ defined above.

The welding center A means a straight line along the up-down direction of the welded rail that passes through the center of the heat-affected zone 111 in the longitudinal cross section of the welded joint portion 11. Usually, the welding center A generally coincides with the rail seam.

Next, a technical concept of the present invention will be explained. The present inventors investigated damage that occurs in the welded joint portion of the welded rail. As a result of an investigation of a damaged rail that occurred on an actual track, it was confirmed that examples of kinds of damage that occurred include (1) breakage originating from a fatigue crack that had occurred from a foot portion of the welded rail, and (2) breakage originating from a brittle crack that had occurred from an inside of a head portion and a web portion of the welded rail. Therefore, causes of these occurrences were investigated.

First, (1) breakage originating from a fatigue crack that occurred from a foot portion was investigated. In the welded joint portions where a fatigue crack had occurred from the foot portion, a deep recessed part was formed at the head portion due to wear. In addition, it was found that at the welded joint portion where a fatigue crack had occurred from the foot portion a HAZ width of the welded joint portion was significantly large.

Figure 3:
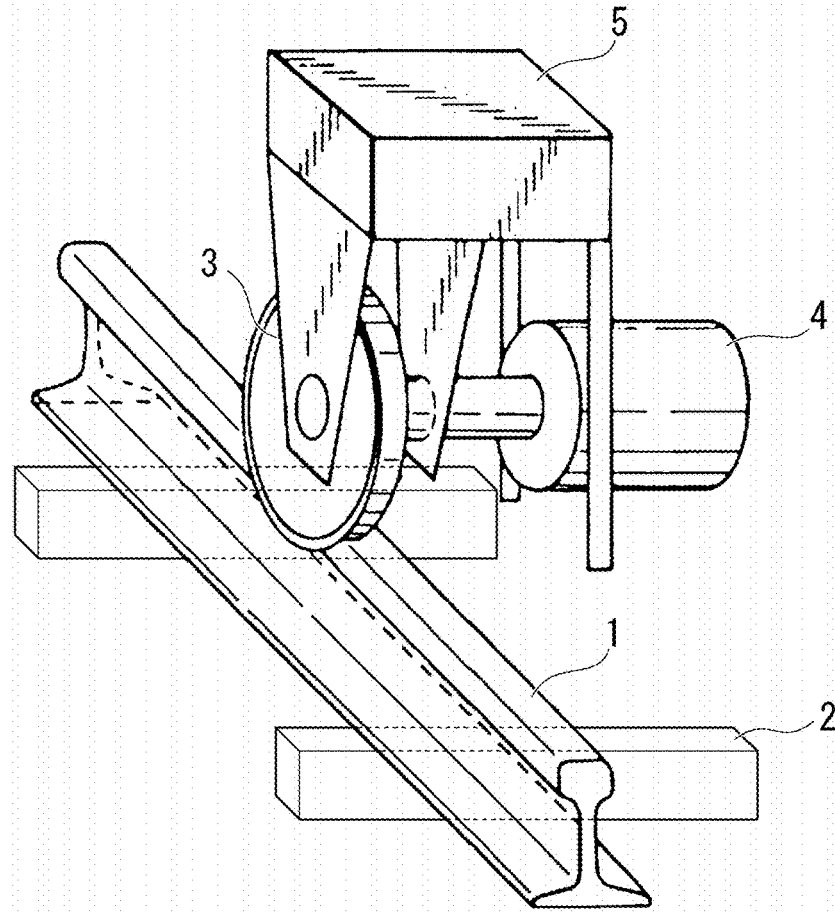
FIG. 3 is a view showing an overview of a rolling fatigue tester that reproduces damage due to rolling between a rail and a wheel.

Furthermore, in order to suppress the breakage originating from the fatigue crack that had occurred from the foot portion of the welded rail, a relationship between the HAZ width of the welded joint portion and the breakage was verified. A flash butt welding test was conducted using a eutectoid steel rail and a hyper-eutectoid steel rail (0.75% to 1.20% C) to produce various welded joints with different HAZ widths. Then, a relationship between the HAZ width and stress at the foot portion of the welded rail was evaluated using a tester that reproduces damage due to rolling between the rail and a wheel shown in FIG. 3. In FIG. 3, reference numeral 1 denotes the welded rail described above, and reference numeral 2 denotes a sleeper on which the welded rail 1 is placed. Reference numeral 5 denotes a load stabilizer that presses a wheel 3 rotated by a motor 4. In a rolling fatigue test, while applying a predetermined load to the wheel 3 using the load stabilizer 5, the wheel 3 is repeatedly rolled back and forth on a head portion of the welded rail 1 along a longitudinal direction. The rail before welding, flash butt welding conditions, characteristics of the flash butt welded joint portion, and conditions of the rolling fatigue test of the welded rail and the wheel are as follows.

[Rolling Test of Welded Rail and Wheel]

Rail Before Welding

Composition: 0.75% to 1.20% C, Si, Mn, Cr, and a remainder consisting of iron and impurities Rail shape: 136 pounds (weight: 67 kg/m).

Hardness of a rail head top portion outer surface: 420 HV

Flash Butt Welding Conditions (Preheating Flash Method)

Initial flash time: 15 seconds

Number of times of preheating: 2 to 16 times

Later flash time: 15 to 30 seconds

Average later flash speed: 0.2 to 1.0 mm/sec

Later flash speed immediately before upsetting (for 3 seconds): 0.3 to 3.0 mm/sec Upset load: 65 to 85 kN Cooling Conditions for the Welded Joint Portion after Welding Average cooling rate of a head top portion: 1.0° C./sec (temperature range: 800° C. to 400° C.)

Average cooling rate of a jaw portion and a web portion: 1.0° C./sec in a temperature range of 800° C. to 500° C., 1.0° C./sec in a temperature range of 500° C. to 400° C., and Subsequent air cooling to 50° C.

Characteristics of the Flash Butt Welded Joint Portion

HAZ width: 10 to 80 mm

Hardness of a welding center: 390 to 440 HV

Hardness of a most softened portion: 280 HV

Conditions of the Rolling Fatigue Test of the Welded Rail and the Wheel

Tester: Rolling fatigue tester (see FIG. 3)

Shape of the welded rail to be a test piece: 2 m in length (a flash butt welded joint portion is present in a center portion in a length direction)

Wheel: AAR type (diameter 920 mm)

Radial load: 300 kN

Thrust load: 50 kN

Stress on a foot portion: 400 MPa (actual value measured using a strain gauge at the beginning of the test)

Lubrication: Repetitive lubrication of water and drying (that is, a cycle in which water is sprayed onto the welded rail for a certain period of time and the supply of water is stopped to dry the water is repeated)

Number of repetitions of load application using the wheel: Up to 4 million times Cumulative passage tonnage: Up to 120 million tons Acceptance criteria: No fracture up to 2 million load applications Cumulative passage tonnage: Total weight of freight cars running on the welded rail. In this test, evaluation was made by twice the passage weight acting from the wheel. That is, the cumulative passage tonnage is a value obtained by multiplying the radial load (300 kN) mentioned above by the number of times the wheel passes×2.

Evaluation

Investigation method for foot portion cracks: visual inspection and magnetic particle inspection

TABLE 1

| HAZ width (mm) | Number of repetitions until fracture (×10,000 times) | Determination |
|---|---|---|
| More than 60 to 80 or less | Less than 200 | Unacceptable |
| 40 or more to 60 or less | 200 to less than 300 | Acceptable |
| 20 or more to less than 40 | 300 or more to less than 400 | Acceptable |
| 10 or more to less than 20 | No fracture after 400 million times of wheel passage | Acceptable |

As a result, as shown in Table 1, the smaller the HAZ width, the greater the number of repetitions until fracture, and the longer a service life of the welded joint portion. Observation of the welded rail after the rolling fatigue test described above revealed that the smaller the HAZ width, the less unevenness generated in the welded joint portion.

Specifically, when the HAZ width exceeded 60 mm, the unevenness generated in the welded joint portion increased, and the number of repetitions of wheel passage until fracture became less than 2 million times, failing to satisfy the acceptance criteria.

In addition, when the HAZ width was in a range of 40 mm to 60 mm, the unevenness generated in the welded joint portion was reduced, the number of repetitions of wheel passage until fracture exceeds 2 million times, and the number of repetitions of wheel passage until fracture was in a range of 2 million times or more and less than 3 million times, which satisfied the acceptance criteria.

Furthermore, when the HAZ width was 20 mm or more and less than 40 mm, the unevenness generated in the welded joint portion was further reduced, and the number of repetitions of wheel passage until fracture was in a range of 3 million times or more and less than 4 million times.

In addition, when the HAZ width was 10 mm or more and less than 20 mm, the unevenness generated in the welded joint portion was further reduced, and fracture did not occur even when the number of repetitions of wheel passage was 4 million times.

From this test, it was found that the service life of the welded joint portion was further improved as the HAZ width decreased.

Next, the cause of (2) breakage originating from a brittle crack that had occurred from an inside of a head portion and a web portion of the welded rail was investigated. As a result of an investigation of a relationship between an origin of breakage and a metallographic structure of the welded rail where the breakage had occurred, it was confirmed that a martensite structure, which reduces toughness, was generated at the origin of the breakage.

Therefore, a relationship between the martensite structure and the breakage of the welded rail was investigated. First, the relationship between the amount of the martensite structure produced and the breakage of the welded rail was investigated. A flash butt welding test was conducted using a eutectoid steel rail and a hyper-eutectoid steel rail (0.75% to 1.20% C), and a drop weight test of the welded rail shown in FIG. 4 was conducted to evaluate the relationship between the amount of the martensite structure produced and presence or absence of the breakage of the welded rail. Flash butt welding conditions and cooling conditions for the welded joint portion after welding were the same as those for the welding tests described above. The rail before welding, characteristics of the flash butt welded joint portion, the evaluation of the martensite structure, and conditions for the drop weight test are as follows.

Rail Before Welding

Composition: 0.75% to 1.20% C, Si, Mn, Cr, and a remainder consisting of iron and impurities Rail shape: 136 pounds (weight: 67 kg/m)

Hardness of a head top portion outer surface: 420 HV

Characteristics of the Flash Butt Welded Joint Portion

HAZ width: 40 mm

Hardness of a welding center: 380 to 440 HV

Hardness of a most softened portion: 280 HV

Area ratio of the martensite structure in a martensite evaluation region B: 0.0001% to 0.2000%

Grain size range of the martensite structure in the martensite evaluation region B: 5 μm or more Calculation of the Area Ratio of the Martensite Structure Evaluation portion (see FIGS. 5A and 5B): Region B surrounded by dashed lines in FIGS. 5A and 5B The region B is described in detail as follows. A left side of FIG. 5A is a cross-sectional view of the welded rail perpendicular to the longitudinal direction of the welded rail. A right side of FIG. 5A is a C-C sectional view taken along a broken line C-C shown in the left side of FIG. 5A, that is, a cross-sectional view of the welded joint portion which is parallel to the longitudinal direction and the up-down direction of the welded rail and passes through a center of the welded joint portion. The center of the welded joint portion is the center of the welded joint portion in a width direction of the welded rail when the welded rail is used. FIG. 5B is a perspective view of a sample for structure observation that is cut from the welded rail and reveals the cross-section shown on the right side of FIG. 5A. The region B is a region having a width of ±5 mm (total width 10 mm) in the longitudinal direction from the welding center A at a depth of 0 mm to t (⅔)×h mm from the rail head top portion outer surface 1211, in the longitudinal cross section of the welded joint portion. Here, "h" means a height of the welded rail 1. Hereinafter, this portion is referred to as a martensite evaluation region B.

Reason for selection of the evaluation portion: The martensite evaluation region B is a portion that is heated to an A1 point or higher in flash butt welding, and is a portion that has been confirmed to be most likely to generate the martensite structure in flash butt welding tests so far.

Observation of the martensite structure: After polishing the martensite evaluation region B, nital etching was performed, observation was performed with an optical microscope, and martensite was photographed.

Polishing conditions: Buff polishing with 1 μm diamond paste

Nital etching conditions: Alcohol+5% nitric acid

Optical microscope observation conditions: 200-fold

Visual field: Entire martensite evaluation region B

Calculation of the area ratio of the martensite structure: An optical micrograph of the martensite evaluation region B is taken at a magnification of 200-fold. Then, the optical micrograph is binarized using an image analysis software. Since martensite is usually displayed in white, an area ratio of white regions in the martensite evaluation region B in the binarized optical micrograph can be regarded as the area ratio of the martensite structure. In addition, in the welded joint portion of the welded rail according to the present embodiment, the metallographic structure other than the martensite structure is a pearlite structure. In the optical micrograph of the metallographic structure, carbide-free martensite appears as white regions and can be clearly distinguished from pearlite. There are cases where a small amount of a bainite structure is included in the welded joint portion of the welded rail. However, in the welded rail according to the present embodiment, the bainite structure in the welded joint portion is regarded as the martensite structure. This is because it is difficult to distinguish between the two in an optical micrograph, and furthermore, the two have substantially the same effect on the breakage resistance of the welded rail.

Figure 4:
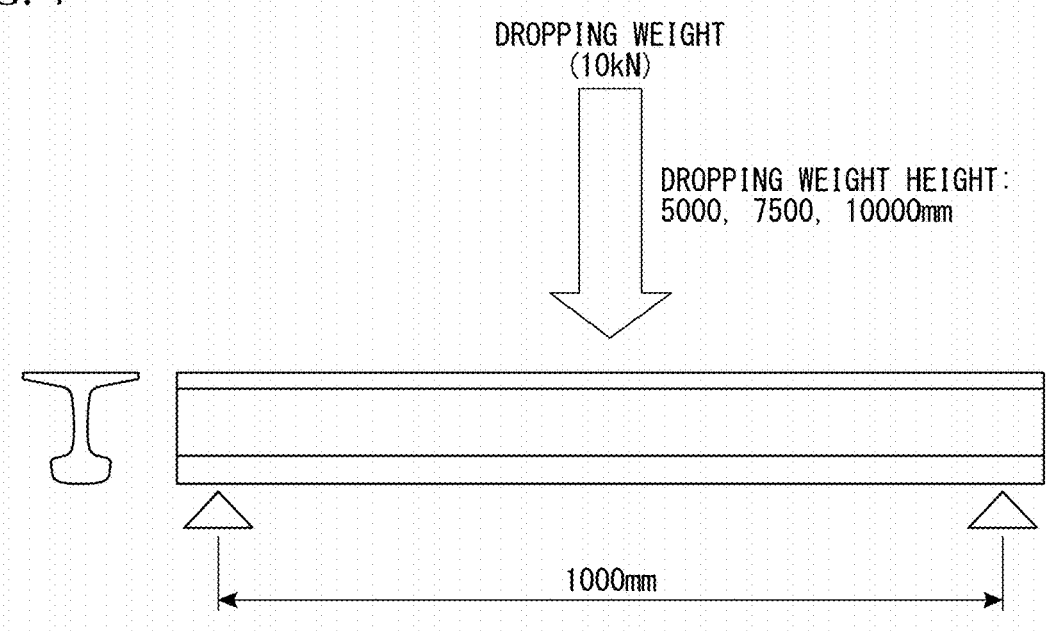
FIG. 4 is a view showing an overview of a drop weight test of the rail.

Drop Weight Test Conditions (See FIG. 4)

Posture: The welded rail is supported at two points with the head portion on a lower side and the foot portion on an upper side, and a weight is dropped onto the foot portion of the welded rail.

Span (interval between the two support points): 1000 mm

Dropping weight: 10 kN

Dropping weight height: 5000 mm

As a result, it was found that when the area ratio of the martensite structure in the martensite evaluation region B of the welded joint portion exceeded 0.1000%, breakage occurred in the welded rail in the drop weight test. Even if the number of martensite structures having a grain size of 20 to 200 μm was 80 or less as described later, breakage had occurred when the area ratio of the martensite structure exceeded 0.1000%.

Furthermore, a relationship between the grain size of the martensite structure in the martensite evaluation region B and the breakage of the welded rail was investigated. A flash butt welding test was conducted using a eutectoid steel rail and a hyper-eutectoid steel rail (0.75% to 1.20% C). Welded joints in which the grain size of the martensite structure was changed by changing cooling conditions after welding were produced. The welded joints were subjected to a drop weight Rail Before Welding Composition: 0.75% to 1.20% C-0.50% Si-1.00% Mn-0.20% Cr-0.0150% P-0.0120% S (a remainder consists of iron and impurities)

Rail shape: 136 pounds (weight: 67 kg/m).

Hardness of a head top portion outer surface: 420 HV

Flash Butt Welding Conditions (Preheating Flash Method)

Cooling conditions for the welded joint portion after welding

Initial flash time: 15 seconds

Number of times of preheating: 10 times

Later flash time: 20 seconds

Average later flash speed: 0.6 mm/sec

Later flash speed immediately before upsetting (for 3 seconds): 1.8 mm/sec

Upset load: 65 kN

Cooling Conditions for the Welded Joint Portion after Welding

Average cooling rate of a head top portion: 1.0° C./sec (temperature range: 800° C. to 400° C.)

Average cooling rate of a jaw portion and a web portion: 0.5 to 2.0° C./sec in a temperature range of 800° C. to 500° C., 1.0° C./sec in a temperature range of 500° C. to 400° C., and Subsequent air cooling to 50° C.

Characteristics of the Flash Butt Welded Joint Portion

HAZ width: 40 mm

Hardness of a welding center: 390 HV

Hardness of a most softened portion: 280 HV

Area ratio of the martensite structure in the martensite evaluation region B: 0.0001% to 0.1000%

Grain size range of the martensite structure in the martensite evaluation region B: 5 μm or more Measurement of the grain size of the martensite structure: For the photograph of the martensite structure in the martensite evaluation region B, an area of each individual martensite structure was measured by image analysis. Then, assuming that a shape of the martensite structure is circular, a circle equivalent diameter thereof was calculated based on the area.

TABLE 2

| Example | 5.0 to 9.9 | 10.0 to 19.9 | 20.0 to 29.9 | 30.0 to 49.9 | 50.0 to 200.0 | Total number of MS (number) | Total number of MS having a grain size of 20 μm or more (number) | Presence or absence of breakage | Area ratio of MS (%) |
|---------|-----------|--------------|--------------|--------------|---------------|------------------------------|--------------------------------------------------------------------|---------------------------------|----------------------|
| 1 | 30 | 60 | 8 | 2 | 0 | 100 | 10 | No breakage | 0.0015 |
| 2 | 20 | 55 | 20 | 4 | 1 | 100 | 25 | No breakage | 0.0031 |
| 3 | 5 | 35 | 50 | 6 | 4 | 100 | 60 | No breakage | 0.0073 |
| 4 | 0 | 10 | 80 | 5 | 5 | 100 | 90 | Breakage | 0.0091 |
| 5 | 0 | 5 | 30 | 40 | 25 | 100 | 95 | Breakage | 0.0311 | test of a rail shown in FIG. 4 to evaluate the relationship between the grain size of the martensite structure and the presence or absence of breakage of the welded rail. The rail before welding, characteristics of the flash butt welded joint portion, and measurement of the grain size of the martensite structure are as follows. The area ratio of the martensite structure and the conditions of the drop weight test are as shown above.

As a result, as shown in Table 2, it was found that the grain size and a number density of the martensite structure in the martensite evaluation region B also affected the breakage resistance of the welded rail. Specifically, when the number of martensite structures having a grain size of 20 to 200 μm in the welded joint portion of the welded rail was more than 80, breakage occurred in the welded rail in the drop weight test. Therefore, it was found that it is necessary to control the amount of generated martensite structure having a grain size of 20 μm or more in order to control breakage of the welded rail.

Furthermore, a relationship between the martensite structure having a grain size of 20 to 200 μm and the breakage of the welded rail was investigated in detail. A flash butt welding test was conducted using a eutectoid steel rail and a hyper-eutectoid steel rail (0.75% to 1.20% C), and welded joints in which the number of martensite structures having a grain size of 20 to 200 μm was changed by changing cooling conditions after welding were produced. The welded joints were subjected to the drop weight test of the welded rail shown in FIG. 4 to evaluate the relationship between the number of the martensite structures having a grain size of 20 to 200 m and the presence or absence of breakage of the welded rail. The rail before welding and characteristics of the flash butt welded joint portion are as follows. Calculation of the area ratio and the grain size of the martensite structure and conditions of the drop weight test are as described above.

Figure 6:
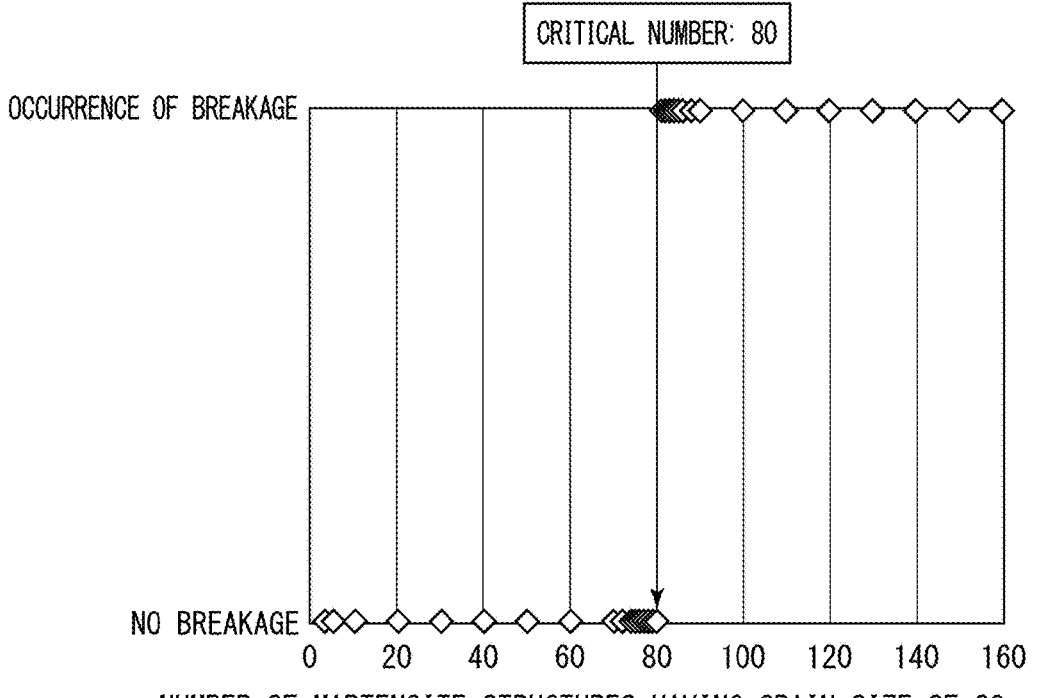
FIG. 6 is a graph showing a relationship between the number of martensite structures having a grain size of 20 to 200 μm in the welded joint portion and rail breakage.

Rail Before Welding
    Composition: 0.75% to 1.20% C-0.50% Si-1.00% Mn-0.20% Cr-0.0150% P-0.0120% S
    Rail shape: 136 pounds (weight: 67 kg/m).
    Hardness of a head top portion outer surface: 420 HV
Flash Butt Welding Conditions (Preheating Flash Method)
    Initial flash time: 15 seconds
    Number of times of preheating: 8 times
    Later flash time: 20 seconds
    Average later flash speed: 1.0 mm/sec
    Later flash speed immediately before upsetting (for 3 seconds): 2.0 mm/sec
    Upset load: 65 kN
Cooling Conditions for the Welded Joint Portion after Welding
    Average cooling rate of a head top portion: 1.0° C./sec (temperature range: 800° C. to 400° C.)
    Average cooling rate of a jaw portion and a web portion: 1.0° C./sec in a temperature range of 800° C. to 500° C., 0.4 to 2.4° C./sec in a temperature range of 500 to 400° C.,
    Subsequent air cooling to 50° C.
Characteristics of the Flash Butt Welded Joint Portion
    HAZ width: 35 mm
    Hardness of a welding center: 390 HV
    Hardness of a most softened portion: 280 HV
    Area ratio of the martensite structure in the martensite evaluation region B: 0.0001% to 0.1000%
    Number of martensite structures having a grain size of 20 to 200 μm in the martensite evaluation region B: 3 to 160
    Grain size range of the martensite structure in the martensite evaluation region B: 20 μm or more
    As a result, as shown in FIG. 6, it was found that in a case where the number of martensite structures having a grain size of 20 to 200 μm was 80 or less in the martensite evaluation region B, no breakage occurred in the welded rail. On the other hand, it was found that in a case where the number of martensite structures having a grain size of 20 to 200 μm exceeded 80 in the martensite evaluation region B, breakage occurred in the welded rail. Therefore, it was found that the number of martensite structures having a grain size of 20 to 200 μm in the martensite evaluation region B has to be controlled to be 80 or less in order to control the breakage of the welded rail.

Furthermore, a method for further suppressing the amount of martensite structure generated in the welded joint portion and further improving the breakage resistance of the welded rail was examined. The present inventors minutely observed portions where the martensite structure was generated. As a result, it was confirmed that the martensite structure was generated in a Cr segregation portion of the welded joint portion.

This result was different from the expectation of the present inventors. In the technical field of iron and steel, it is known that martensite tends to form in a Mn segregation portion. For example, OCHIAI et al., "Effect of Soaking Treatment of Continuously Cast Bloom on Manganese Segregation of High-Carbon Steel Wire Rod" Tetsu-to-Hagane, 1989, Issue 7, pp. 1217 and the like, it was reported that martensite is generated in a Mn segregation portion. Therefore, the present inventors expected that the portion where the martensite structure was generated and the Mn segregation portion would coincide with each other in the welded joint portion of the welded rail. Contrary to the expectation, however, the present inventors found that the segregation of Cr affects the amount of generated martensite structure and the like. Specifically, when the present inventors investigated a region where martensite was generated in detail, while Mn and Cr were segregated in the vicinity of the region where martensite was generated, only Cr was segregated in the region where martensite was generated.

The reason why Mn promotes the generation of martensite is that Mn suppresses generation of ferrite. In hypo-eutectoid steel, a pro-eutectoid phase is ferrite, so that suppression of generation of ferrite by Mn promotes the generation of martensite. On the other hand, the welded rail according to the present embodiment is hyper-eutectoid steel, and has cementite as a pro-eutectoid phase. Therefore, it is estimated that an effect of Mn in promoting the generation of martensite in hyper-eutectoid steel is smaller than in hypo-eutectoid steel. For the above reasons, the present inventors presume that instead of Mn segregation, Cr segregation has to be suppressed as means for suppressing the generation of martensite.

Therefore, for two kinds of rail having different Cr segregation degrees, a situation in which the martensite structure was generated and a Cr segregation state of a portion where the martensite structure was generated were analyzed in detail. The rails, characteristics of a flash butt welded joint portion, an analysis method, and a quantification method of a Cr-concentrated state are as follows. Calculation of the area ratio and the grain size of the martensite structure is as described above.

Rail Before Welding
    Composition: 0.85% C-0.50% Si-1.00% Mn-0.20% Cr-0.0150% P-0.0120% S
    Rail shape: 136 pounds (weight: 67 kg/m).
    Hardness of a head top portion outer surface: 420 HV
Flash Butt Welding Conditions (Preheating Flash Method)
    Initial flash time: 15 seconds
    Number of times of preheating: 2 to 14 times
    Later flash time: 15 to 30 seconds
    Average later flash speed: 0.3 to 1.2 mm/sec
    Later flash speed immediately before upsetting (for 3 seconds): 0.5 to 3.0 mm/sec
    Upset load: 65 to 85 kN
Cooling Conditions for the Welded Joint Portion after Welding
    Average cooling rate of a head top portion: 1.0° C./sec (temperature range: 800° C. to 400° C.)
    Average cooling rate of a jaw portion and a web portion: 0.5 to 2.0° C./sec in a temperature range of 800° C. to 500° C., 0.4 to 1.6° C./sec in a temperature range of 500° C. to 400° C., Subsequent air cooling to 50° C.

Characteristics of the Flash Butt Welded Joint Portion

HAZ width: 10 to 60 mm

Area ratio of the martensite structure in the martensite evaluation region B: 0.0001% to 0.1000%

Grain size range of the martensite structure in the martensite evaluation region B: 20 μm or more Analysis Method Device: Electron probe micro analyzer (EPMA)

Analysis elements: C, Si, Mn, Cr, P, and S

Beam diameter: 2 μm

Evaluation Method of the Cr Segregation Degree in the Martensite Evaluation Region B of the Welded Joint Portion Analysis position: Martensite evaluation region B Quantification: A portion with a concentrated Cr component was positioned as a segregation portion, a segregation portion Cr concentration of each segregation portion and a bulk Cr concentration were obtained, a Cr segregation degree of each portion was calculated, and an average value of top 20 Cr segregation degrees from a maximum Cr segregation degree was calculated as the Cr segregation degree in the martensite evaluation region B of the welded joint portion.

Cr concentration in the segregation portion: A value obtained by obtaining a maximum value of the Cr concentration from a Cr concentration profile of the segregation portion and averaging the maximum value of the Cr concentration and the bulk concentration (see FIG. 7).

Bulk Cr concentration: A value obtained by obtaining a Cr concentration in a portion with no segregation portion from the Cr concentration profile of the segregation portion. The Cr concentration in the portion with no segregation portion is a value obtained by averaging Cr concentrations in regions having a length of 1000 m in a Cr concentration distribution present on left and right sides of the segregation portion. In a case where the values on the left and right sides of the segregation portion are different, the smaller value is taken as the bulk concentration (see FIG. 7).

At each analysis position, a Cr segregation degree of each portion is obtained from the following formula.

$$\text{Cr segregation degree of each portion} = \text{segregation portion Cr concentration of each portion/bulk Cr concentration of each portion}$$

Next, a procedure for evaluating the Cr segregation degree will be specifically described below.

First, by surface analysis of EPMA, in a martensite evaluation region B of a cross section of a welded joint, an element distribution map in a depth range of $(\frac{1}{6}) \times h$ to $(\frac{3}{6}) \times h$ from the head top portion outer surface of the welded rail is created. Based on the element distribution map, a region where Cr is concentrated is specified, and this region is specified as a macro segregation zone.

Figure 7:
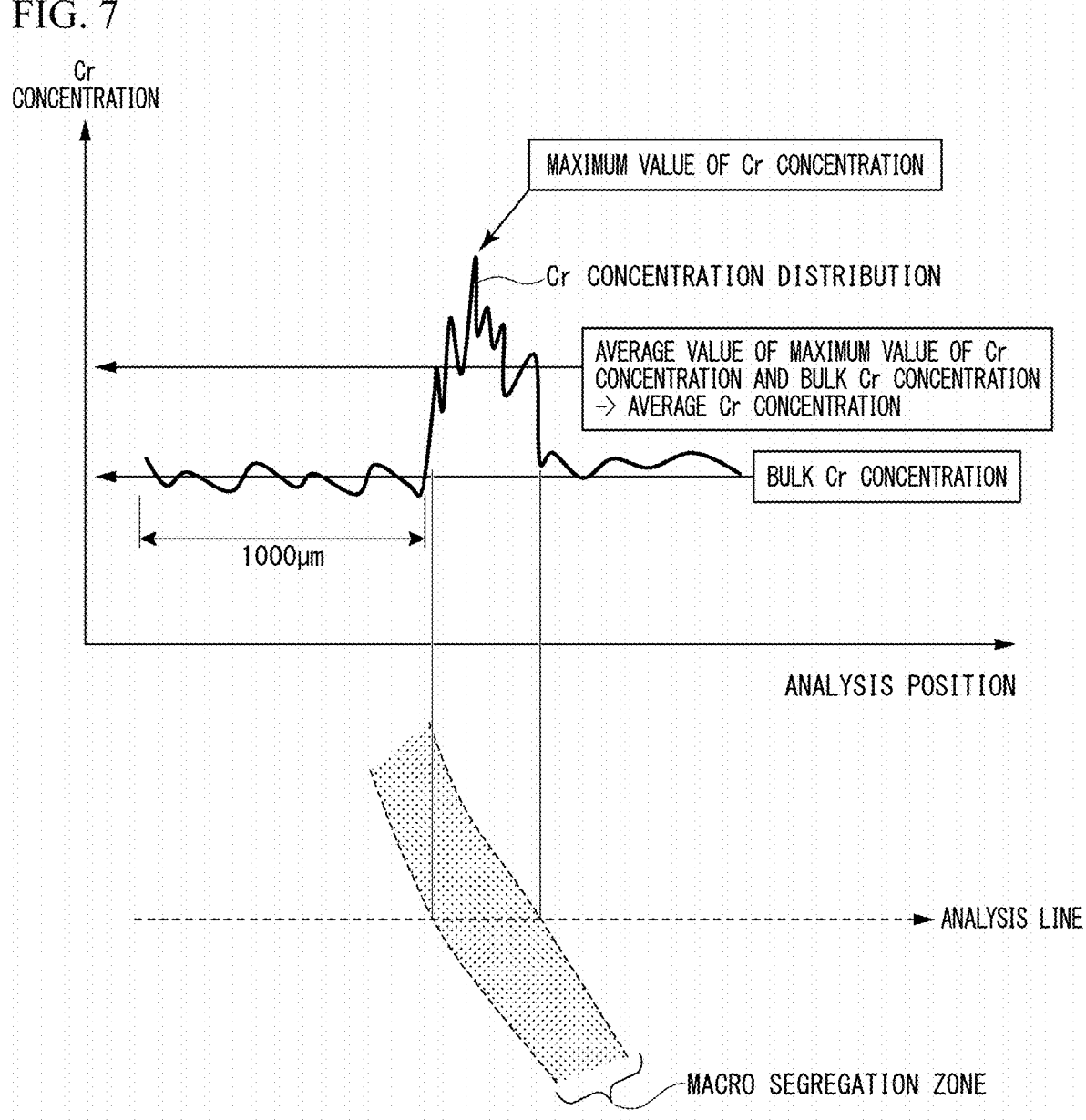
FIG. 7 is a graph showing a method of calculating a Cr concentration in a segregation portion.

Then, as shown in FIG. 7, the Cr concentration is continuously analyzed along a line crossing the segregation zone (so-called line analysis). In a case where the segregation zone has a shape following a length such as an ellipse, line analysis is performed so as to pass through a center of the segregation zone. This line analysis is performed on the entire cross section of the welded joint. This evaluation is performed on cross sections of three welded joints, and an average value of Cr segregation degrees of top 20 portions of Cr segregation degrees of portions in the cross sections of the three welded joints is obtained. This is regarded as a "Cr segregation degree" in the following formula.

$$\text{Cr segregation degree} = \text{segregation portion Cr concentration/bulk Cr concentration}$$

Drop Weight Test Conditions (See FIG. 4)

Posture: The welded rail is supported at two points with the head portion on the lower side and the foot portion on the upper side, and a weight is dropped onto the foot portion.

Span (interval between the two support points): 1000 mm

Dropping weight: 10 kN

Dropping weight height: 5000 mm, 7500 mm, or 10,000 mm

Figure 8:
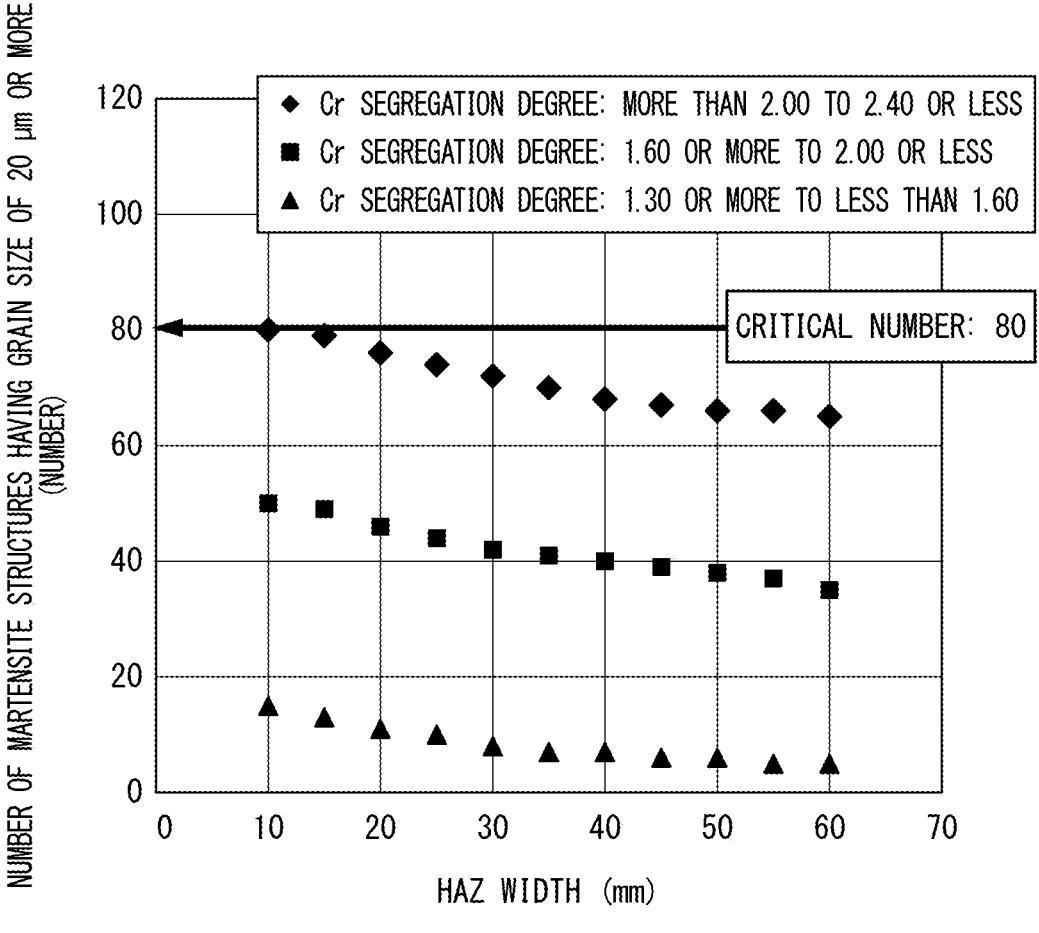
FIG. 8 is a graph showing a relationship between a HAZ width of the welded joint portion and the number of martensite structures having a grain size of 20 to 200 μm.

As a result, as shown in FIG. 8, it was confirmed that Cr was concentrated in the segregation portion which was the portion where the martensite structure was generated. It was found that there is a correlation between the concentration of Cr and a precipitation state of martensite, and that the higher the degree of concentration of Cr, the larger the amount of martensite generated.

Therefore, as a result of detailed observation of martensite structures of welded joint portions of welded rails having different average Cr segregation degrees, as shown in FIG. 8, it was found that in a welded rail in which a Cr segregation degree in a martensite evaluation region B of a welded joint portion (hereinafter, referred to as a "Cr segregation degree of a welded joint portion") was reduced to 2.0 or less, the number of martensite structures having a grain size of 20 to 200 μm decreased in the same HAZ width.

Specifically, in a welded rail having a Cr segregation degree of a welded joint portion of more than 2.0 to 2.4 or less, the number of martensite structures having a grain size of 20 to 200 μm was 65 to 80. On the other hand, it was found that in a welded rail in which a Cr segregation degree of a welded joint portion was in a range of 1.6 to 2.0, the number of martensite structures having a grain size of 20 to 200 m was reduced to 35 to 50 in the same HAZ width. Furthermore, in a welded rail in which a Cr segregation degree of a welded joint portion was in a range of 1.3 or more to less than 1.6, the number of martensite structures having a grain size of 20 to 200 m was reduced to 5 to 15 in the same HAZ width.

Furthermore, Table 3 shows results of the drop weight test. As a result of the drop weight test, in the welded rail in which the Cr segregation degree of the welded joint portion was in a range of more than 2.0 to 2.4 or less and the number of martensite structures having a grain size of 20 to 200 μm was 65 to 80, the welded rail was not broken at a dropping weight height of 5000 mm. On the other hand, in the welded rail in which the Cr segregation degree of the welded joint portion was in a range of 1.6 to 2.0 and the number of martensite structures having a grain size of 20 to 200 μm was reduced to 35 to 50, no breakage had occurred even at a dropping weight height of 7500 mm. In addition, in the welded rail in which the Cr segregation degree of the welded joint portion was in a range of 1.3 or more to less than 1.6 and the number of martensite structures having a grain size of 20 to 200 μm was reduced to 5 to 15, it was confirmed that no breakage had occurred even at a dropping weight height of 10,000 mm, and breakage resistance was further improved.

TABLE 3

| Control of light rolling reduction of rail | Cr segregation degree of welded joint portion | HAZ width (mm) | Number of martensite having a grain size of 20 μm or more (number) | Dropping weight height (mm) | | |
| --- | --- | --- | --- | --- | --- | --- |
| | | | | 5000 | 7500 | 10000 |
| Absent | More than 2.00 to 2.40 or less | 10 to 60 | 65 to 80 | No breakage | Breakage | Breakage |
| 1 | 1.60 or more to 2.00 or less | 10 to 60 | 35 to 50 | No breakage | No breakage | Breakage |
| 2 | 1.30 or more to less than 1.60 | 10 to 60 | 5 to 15 | No breakage | No breakage | No breakage |

From these results, it was found that in a flash butt welded joint portion, in order to further improve breakage resistance due to a brittle crack generated from an inside of a head portion of a welded rail due to generation of a martensite structure, it is necessary to further reduce the number of martensite structures by further reducing a Cr segregation degree of the welded joint portion.

The welded rail according to the present embodiment, which is excellent in fatigue damage resistance and breakage resistance obtained based on the above findings, will be described in detail below. Hereinafter, a unit "mass %" of amounts in an alloy composition is simply described as "%".

(1) Reasons for Limiting a Chemical Composition of Steel

The reason for limiting a chemical composition of the rail portion of the welded rail of the present embodiment will be described in detail.

C is an element effective for promoting pearlitic transformation, suppressing the generation of the martensite structure in the welded joint portion, and securing the wear resistance of the welded rail. When a C content is less than 0.75%, a pro-eutectoid ferrite structure is generated in this composition system, so that minimum strength and wear resistance required for welded joint portions primarily containing a pearlite structure cannot be maintained. In addition, even if the C content is less than 0.75%, the effect of suppressing the generation of the martensite structure in the welded joint portion is not exhibited. On the other hand, when the C content exceeds 1.20%, a pro-eutectoid cementite structure is likely to be generated in the welded joint portion, and the breakage resistance and wear resistance of the pearlite structure decrease. Therefore, the C content is limited to 0.75% to 1.20%. The C content is preferably 0.80% or more, 0.85% or more, or 0.90% or more. The C content is preferably 1.15% or less, 1.10% or less, or 1.00% or less. In order to stabilize the generation of the pearlite structure, it is desirable to set the C content to 0.80% to 1.10%.

Si is an element that dissolves in ferrite of the pearlite structure, increases hardness of the welded joint portion, and improves the wear resistance. However, when a Si content is less than 0.10%, these effects cannot be sufficiently expected. On the other hand, when the Si content exceeds 2.00%, hardenability of rail steel is significantly increased, a large amount of martensite structures is generated in the welded joint portion, and the breakage resistance and wear resistance of the welded rail decrease. Therefore, the Si content is limited to 0.10% to 2.00%. The Si content is preferably 0.20% or more, 0.30% or more, or 0.50% or more. The Si content is preferably 1.80% or less, 1.60% or less, or 1.50% or less. In order to stabilize the generation of the pearlite structure and improve the breakage resistance and wear resistance of the welded rail, it is desirable to set the Si content to 0.20% to 1.50%.

Cr is an element that raises an equilibrium transformation temperature, refines a lamellar spacing of the pearlite structure by increasing a degree of supercooling, improves the hardness of the pearlite structure, and improves the wear resistance of the welded joint portion. However, when a Cr content is less than 0.10%, these effects cannot be sufficiently expected. On the other hand, in a case where the Cr content exceeds 1.50%, the hardenability of the rail steel is significantly increased, a bainite structure, a martensite structure, and the like are generated in the welded joint portion, and the wear resistance and breakage resistance of the welded rail decrease. Furthermore, an excessive amount of Cr promotes concentration of Cr in a segregation portion and promotes the generation of the martensite structure in the welded joint portion. Accordingly, an excessive amount of Cr causes coarsening of the martensite structure in the welded joint portion and an increase in the number of martensite structures generated. Therefore, the Cr content is limited to 0.10% to 1.50%. The Cr content is preferably 0.20% or more, 0.30% or more, or 0.50% or more. The Cr content is preferably 1.40% or less, 1.30% or less, and 1.00% or less. In order to stabilize the generation of the pearlite structure and improve the wear resistance of the welded rail, the Cr content is preferably set to 0.20% to 1.00%.

Mn is an element that enhances the hardenability of the welded rail, stabilizes the pearlitic transformation, refines the lamellar spacing of the pearlite structure, secures the hardness of the welded joint portion, and further improves the wear resistance. However, when a Mn content is less than 0.10%, the effect is small, a soft pro-eutectoid ferrite structure is generated, and the wear resistance of the welded joint portion decreases. On the other hand, when the Mn content exceeds 2.00%, the hardenability of the rail steel is significantly increased, the bainite structure, the martensite structure, and the like are generated in the welded joint portion, and the breakage resistance and wear resistance of the welded rail decrease. Therefore, the Mn content is limited to 0.10% to 2.00%. The Mn content is preferably 0.20% or more, 0.30% or more, or 0.50% or more. The Mn content is preferably 1.80% or less, 1.60% or less, or 1.50% or less. In order to stabilize the generation of the pearlite structure and improve the wear resistance and breakage resistance of the welded joint portion, it is desirable to set the Mn content to 0.20% to 1.50%.

P is an impurity element contained in steel. When a P content exceeds 0.0250%, the breakage resistance of the welded joint portion decreases due to embrittlement of the pearlite structure. Therefore, the P content is limited to 0.0250% or less. A lower limit of the P content does not need to be limited, and may be, for example, 0%. However, considering a dephosphorization ability in a refining step, the lower limit of the P content may be about 0.0020%. The P content is preferably 0.0025% or more, 0.0030% or more, or 0.0050% or more. The P content is preferably 0.0200% or less, 0.0150% or less, or 0.0120% or less.

S is an impurity element contained in steel. When a S content exceeds 0.0250%, stress concentration occurs in the vicinity of around coarse MnS-based sulfide inclusions, and the breakage resistance of the welded joint portion decreases. Therefore, the S content is limited to 0.0250% or less. A lower limit of the S content does not need to be limited, and may be, for example, 0%. However, considering a desulfurization ability in the refining step, the lower limit of the S content may be about 0.0020%. The S content is preferably 0.0025% or more, 0.0030% or more, or 0.0050% or more. The S content is preferably 0.0200% or less, 0.0150% or less, or 0.0120% or less.

Furthermore, the rail portion manufactured with the above composition may contain one or more selected from the group consisting of Mo, Co, B, Cu, Ni, V, Nb, Ti, Mg, Ca, REM, N, Zr, and Al for the purpose of improving the wear resistance by increasing the hardness of the welded joint portion, improving toughness, preventing softening of a welded heat-affected zone, and controlling a cross-sectional hardness distribution of the inside of the head portion. However, even if these elements are not contained in the rail portion, the welded rail according to the present embodiment can exhibit its effects, so that the lower limits of the amounts of these elements are 0%.

Mo raises an equilibrium transformation point, refines the lamellar spacing of the pearlite structure, and improves the hardness of the welded joint portion. Co dissolves in the ferrite of the pearlite structure, refines a lamellar structure immediately below a rolling surface of the welded joint portion, and increases hardness of a worn surface. B reduces dependence of a pearlitic transformation temperature on a cooling rate and makes the hardness distribution of the inside the head portion of the welded joint portion uniform. Cu and Ni dissolve in the ferrite in the pearlite structure, increase the hardness of the welded joint portion, and simultaneously improve the toughness. V, Nb, and Ti improve fatigue strength of the welded joint portion by precipitation hardening of carbides, nitrides, and the like generated during cooling of the welded rail after welding the rail. In addition, V, Nb, and Ti stably generate carbides, nitrides, and the like during reheating, and prevent the softening of the heat-affected zone of the welded joint. Mg, Ca, and REM cause MnS-based sulfides to be finely dispersed and reduce fatigue damage generated from inclusions in the welded joint portion. N promotes precipitation of carbides, nitrides, and the like of V during a subsequent cooling process after welding, and improves the fatigue damage resistance of the welded joint portion. Zr suppresses formation of a segregation zone in a central part of a cast piece by increasing an equiaxed crystal ratio of a solidification structure, suppresses the generation of the pro-eutectoid cementite structure, the martensite structure, and the like, and suppresses concentration of Cr in the segregation portion of the welded rail. Furthermore, Al moves a eutectoid transformation temperature to a high temperature side, suppresses the generation of the pro-eutectoid cementite structure, and improves the breakage resistance of the welded joint portion.

Mo is an element that raises the equilibrium transformation temperature, refines the lamellar spacing of the pearlite structure by increasing the degree of supercooling, improves the hardness of the pearlite structure, and improves the wear resistance of the welded joint portion. In order to obtain the above effect, a Mo content is preferably set to 0.01% or more. On the other hand, in a case where the Mo content exceeds 0.50%, a transformation rate is significantly lowered, the martensite structure is generated in the welded joint portion, and there are cases where the breakage resistance of the welded joint portion decreases. Therefore, it is desirable to set the Mo content to 0.01% to 0.50%. The Mo content is preferably 0.02% or more, 0.05% or more, or 0.10% or more. The Mo content is preferably 0.45% or less, 0.40% or less, or 0.30% or less.

Co is an element that dissolves in the ferrite of the pearlite structure, refines the lamellar structure of the pearlite structure immediately below the rolling surface where deformation occurs due to contact with the wheel, improves the hardness of the rolling surface, and improves the wear resistance of the welded joint portion. In order to obtain the above effects, a Co content is preferably set to 0.01% or more. On the other hand, when the Co content exceeds 1.00%, the above effects are saturated, and refinement of the lamellar structure due to the Co content cannot be achieved. In addition, when the Co content exceeds 1.00%, an alloying cost increases, resulting in a decrease in economy. Therefore, it is desirable to set the Co content to 0.01% to 1.00%. The Co content is preferably 0.02% or more, 0.05% or more, or 0.10% or more. The Co content is preferably 0.90% or less, 0.80% or less, or 0.60% or less.

B is an element that forms iron cubic boron carbide ($Fe_{23}(CB)_6$) at austenite grain boundaries, reduces the dependence of the pearlitic transformation temperature on the cooling rate by an effect of promoting the pearlitic transformation, makes a hardness distribution from a head surface to the inside of the welded joint portion uniform, and thus extends a life of the welded rail. In order to obtain the above effects, a B content is preferably set to 0.0001% or more. On the other hand, when the B content exceeds 0.0050%, coarse iron cubic boron carbide are generated, which may promote brittle fracture, and there are cases where the breakage resistance of the welded joint portion decreases. Therefore, it is desirable to set the B content to 0.0001% to 0.0050%. The B content is preferably 0.0002% or more, 0.0005% or more, or 0.0010% or more. The B content is preferably 0.0040% or less, 0.0030% or less, and 0.0020% or less.

Cu is an element that dissolves in the ferrite of the pearlite structure, improves the hardness of the welded rail by solid solution strengthening, and improves the wear resistance of the welded joint portion. In order to obtain the above effects, a Cu content is preferably set to 0.01% or more. On the other hand, when the Cu content exceeds 1.00%, the martensite structure is generated in the welded joint portion due to a significant improvement in the hardenability of the rail steel, and there are cases where the breakage resistance decreases. Therefore, it is preferable to set the Cu content to 0.01% to 1.00%. The Cu content is preferably 0.02% or more, 0.05% or more, or 0.10% or more. The Cu content is preferably 0.90% or less, 0.80% or less, or 0.60% or less. In order to secure the hardness of the welded joint portion and suppress the generation of the martensite structure, it is desirable to control the Cu content to 0.20% or less.

Ni is an element that improves toughness of the pearlite structure, improves the hardness of the welded rail by solid solution strengthening, and improves the wear resistance of the welded joint portion. Furthermore, in the welded heat-affected zone, Ni is an element that is bonded to Ti and precipitates as fine intermetallic compounds of $Ni_3Ti$, thereby suppressing softening of the welded joint portion by precipitation hardening. In a case where Cu is contained in the welded rail, Ni suppresses intergranular embrittlement. In order to obtain the above effects, a Ni content is preferably set to 0.01% or more. When the Ni content exceeds 1.00%, the martensite structure is generated in the welded joint portion due to a significant improvement in the hardenability of the rail steel, and there are cases where the wear resistance and breakage resistance decrease. Therefore, it is desirable to set the Ni content to 0.01% to 1.00%. The Ni content is preferably 0.02% or more, 0.05% or more, or 0.10% or more. The Ni content is preferably 0.90% or less, 0.80% or less, or 0.60% or less.

V is an element that increases the hardness (strength) of the pearlite structure by precipitation hardening due to carbides and nitrides of V generated in a cooling process after hot rolling, and improves the fatigue damage resistance of the welded joint portion. In order to obtain the above effects, a V content is preferably set to 0.01% or more. On the other hand, when the V content exceeds 0.50%, the number of fine carbides and nitrides of V becomes excessive, the pearlite structure becomes embrittled, there are cases where the fatigue damage resistance of the welded joint portion decreases. Therefore, it is desirable to set the V content to 0.01% to 0.50%. The V content is preferably 0.02% or more, 0.03% or more, or 0.04% or more. The V content is preferably 0.45% or less, 0.40% or less, or 0.30% or less.

Nb is an element that increases the hardness of the pearlite structure by precipitation hardening due to Nb carbides and Nb nitrides generated in the cooling process after hot rolling, and improves the fatigue damage resistance of the welded joint portion. In addition, in the welded heat-affected zone reheated to a temperature range of an Ac1 point or lower, Nb is an element that stably generates Nb carbides, Nb nitrides, and the like in a wide temperature range from a low temperature range to a high temperature range, and is thus effective in preventing softening of the heat-affected zone of the welded joint. In order to obtain the above effects, the Nb content is preferably set to 0.0010% or more. On the other hand, when the Nb content exceeds 0.0500%, precipitation hardening due to carbides, nitrides, and the like of Nb becomes excessive, the pearlite structure itself becomes embrittled, and there are cases where the fatigue damage resistance of the welded joint portion decreases. Therefore, it is desirable to set the Nb content to 0.0010% to 0.0500%. The Nb content is preferably 0.0020% or more, 0.0025% or more, or 0.0050% or more. The Nb content is preferably 0.0400% or less, 0.0300% or less, or 0.0200% or less.

Ti is an element that increases the hardness of the pearlite structure by precipitation hardening due to Ti carbides and Ti nitrides generated in the cooling process after hot rolling, and improves the fatigue damage resistance of the welded joint portion. In addition, Ti is a component effective in refining a structure of the heat-affected zone heated to an austenite region by utilizing the fact that Ti carbides and Ti nitrides precipitated during reheating at the time of welding do not dissolve in a matrix and thus preventing the embrittlement of the welded joint portion. In order to obtain the above effects, a Ti content is preferably set to 0.0030% or more. On the other hand, when the Ti content exceeds 0.0500%, coarse Ti carbides and Ti nitrides are generated, stress concentration in the vicinity thereof tends to cause fatigue cracks, and there are cases where the fatigue damage resistance of the welded joint portion decreases. Therefore, it is desirable to set the Ti content to 0.0030% to 0.0500%. The Ti content is preferably 0.0040% or more, 0.0050% or more, or 0.0080% or more. The Ti content is preferably 0.0400% or less, 0.0300% or less, or 0.0200% or less.

Mg is an element that is bonded to S to form fine sulfide (MgS), and this MgS causes MnS to be finely dispersed and thus relieves stress concentration in the vicinity of MnS, thereby improving the fatigue damage resistance of the welded joint portion. In order to obtain the above effects, a Mg content is preferably set to 0.0005% or more. On the other hand, in a case where the Mg content exceeds 0.0200%, coarse oxides of Mg are generated, stress concentration in the vicinity of the coarse oxides tends to cause fatigue cracks, and there are cases where the fatigue damage resistance of the welded joint portion decreases. Therefore, it is desirable to set the Mg content to 0.0005% to 0.0200%. The Mg content is preferably 0.0010% or more, 0.0020% or more, or 0.0050% or more. The Mg content is preferably 0.0180% or less, 0.0150% or less, or 0.0120% or less.

Ca is an element that has a strong binding force with S and thus forms sulfide (CaS), and this CaS causes MnS to be finely dispersed and thus relieves stress concentration in the vicinity of MnS, thereby improving the fatigue damage resistance of the welded joint portion. In order to obtain the above effects, a Ca content is preferably set to 0.0005% or more. On the other hand, when the Ca content exceeds 0.0200%, coarse oxides of Ca are generated, stress concentration in the vicinity of the coarse oxides tends to cause fatigue cracks, and there are cases where the fatigue damage resistance of the welded joint portion decreases. Therefore, it is desirable to set the Ca content to 0.0005% to 0.0200%. The Ca content is preferably 0.0010% or more, 0.0020% or more, or 0.0050% or more. The Ca content is preferably 0.0180% or less, 0.0150% or less, or 0.0120% or less.

REM (Rare Earth Metals) is a deoxidizing and desulfurizing element, generates REM oxysulfide ($REM_2O_2S$), and serves as a nucleus for Mn sulfide-based inclusions. Oxysulfide ($REM_2O_2S$) has a high melting point, and thus suppresses stretching of the Mn sulfide-based inclusions after rolling. As a result, REM causes MnS to be finely dispersed, and relieves stress concentration in the vicinity of MnS, thereby improving the fatigue damage resistance of the welded joint portion. In order to obtain the above effects, a REM content is preferably set to 0.0005% or more. On the other hand, when the REM content exceeds 0.0500%, coarse and hard REM oxysulfide ($REM_2O_2S$) is generated, stress concentration in the vicinity of this oxysulfide tends to cause fatigue cracks, and there are cases where the fatigue damage resistance of the welded joint portion decreases. Therefore, it is desirable to set the REM content to 0.0005% to 0.0500%. The REM content is preferably 0.0010% or more, 0.0020% or more, or 0.0050% or more. The REM content is preferably 0.0400% or less, 0.0300% or less, or 0.0250% or less.

REM is a total of 17 elements consisting of Sc, Y, and La (lanthanides). The "REM content" means the total amount of all these REM elements. As long as the total amount is within the above range, the same effect can be obtained regardless of whether the number of kinds of REM elements is one or two or more.

N is an impurity element incorporated in a steelmaking process. About 0.0020% of N remains in the steel even if degassing is actively performed. According to normal refining, a N content reaches about 0.0040%. In addition, N is an element that is segregated at the austenite grain boundaries, promotes the pearlitic transformation from the austenite grain boundaries, mainly refines a pearlite block size, and is thus effective in improving the toughness of the welded joint portion. In addition, when N and V are contained at the same time, precipitation of carbonitrides of V is promoted in the cooling process after welding of the rail, so that the hardness of the pearlite structure is increased, and the fatigue damage resistance of the welded joint portion is improved. In order to obtain the above effects, the N content is preferably set to 0.0020% or more, or 0.0050% or more. On the other hand, when the N content exceeds 0.0200%, it becomes difficult to dissolve N into the steel, and there are cases where bubbles that are origins of fatigue damage are likely to be generated. Therefore, it is desirable to set the N content to 0.0020% to 0.0200%.

Zr is an element that forms $ZrO_2$ inclusions having good lattice matching with γ-Fe, and γ-Fe becomes a solidification nucleus of a high-carbon rail steel, which is a solidification primary phase, and increases an equiaxed crystal ratio of a solidification structure, thereby suppressing formation of a segregation zone in a central part of a cast piece, and suppressing the generation of the martensite structure generated in the welded joint portion. In order to obtain the above effects, a Zr content is preferably set to 0.0001% or more. On the other hand, when the Zr content exceeds 0.0200%, a large amount of coarse Zr-based inclusions are generated, stress concentration in the vicinity of the coarse inclusions tends to cause fatigue cracks, and there are cases where the fatigue damage resistance of the welded joint portion decreases. Therefore, it is desirable to set the Zr content to 0.0001% to 0.0200%. The Zr content is preferably 0.0010% or more, 0.0020% or more, or 0.0050% or more. The Zr content is preferably 0.0180% or less, 0.0150% or less, and 0.0120% or less.

Al is an element that raises the eutectoid transformation temperature, suppresses the generation of the pro-eutectoid cementite structure that is harmful to the toughness, and improves the breakage resistance of the welded joint portion. In order to obtain the above effects, an Al content is set to preferably 0.0100% or more, and more preferably 0.500% or more. On the other hand, when the Al content exceeds 1.00%, it becomes difficult to dissolve Al in steel, coarse alumina-based inclusions are generated, fatigue cracks are likely to occur from these coarse inclusions, and there are cases where the fatigue damage resistance of the welded joint portion decreases. Furthermore, when the Al content exceeds 1.00%, oxides are generated during rail welding, and there are cases where rail weldability significantly decreases. Therefore, it is desirable to set the Al content to 0.0100% to 1.00%. The Al content is preferably 0.0200% or more, 0.0500% or more, or 0.1000% or more. The Al content is preferably 1.80% or less, 1.50% or less, or 1.20% or less.

The remainder of the chemical composition in the rail portion of the welded rail according to the present embodiment includes iron and impurities (elements other than S, P, N, and Al described above). Impurities are raw materials such as ores or scraps, or components incorporated in due to various factors in the manufacturing process when steel is industrially manufactured, for example, and mean those that are permissible within a range that does not adversely affect the welded rail according to the present embodiment.

The rail steel having the composition described above is melted in a commonly used melting furnace such as a converter or an electric furnace, and the molten steel is subjected to a continuous casting method to manufacture a steel ingot (bloom) and is then subjected to hot rolling to manufacture a rail. Furthermore, a heat treatment is performed for the purpose of controlling the metallographic structure and hardness of the head portion of the welded rail as necessary. A method of manufacturing the rail steel will be described later.

(2) Reason for Limiting HAZ Width of Flash Butt Welded Joint Portion

Next, in the present embodiment, the reason for limiting the HAZ width of the welded joint portion to 60 mm or less will be described. As shown in Table 1, as the HAZ width decreases, the unevenness generated in the welded joint portion is reduced, the number of repetitions until fracture is increased, and the service life of the welded joint portion is improved. Specifically, when the HAZ width exceeds 60 mm, the unevenness generated in the welded joint portion becomes large, and the number of repetitions until fracture becomes less than 2 million times, failing to satisfy the acceptance criteria. In addition, when the HAZ width is in a range of 40 mm to 60 mm, the unevenness generated in the welded joint portion is reduced, and the number of repetitions until fracture exceeds 2 million, satisfying the acceptance criteria. Furthermore, when the HAZ width is 20 mm or more and less than 40 mm, unevenness generated in the welded joint portion is further reduced, and the number of repetitions until fracture is in a range of 3 million to 4 million times. Furthermore, when the HAZ width is 10 mm or more and less than 20 mm, the unevenness generated in the welded joint portion is further reduced, and fracture does not occur even when the number of repetitions is 4 million times. Accordingly, the service life of the welded joint portion is further improved as the HAZ width decreases. As a result of the rolling test of the welded rail and the wheel, the above-described intent was confirmed. Therefore, the HAZ width of the welded joint portion was limited to 60 mm or less. The HAZ width of the welded joint portion may be set to 55 mm or less, 50 mm or less, 40 mm or less, 30 mm or less, or 25 mm or less. In order to stably improve the number of repetitions until fracture, it is desirable to control the HAZ width in a range of 15 to 25 mm.

A lower limit of the HAZ width is not particularly limited. However, in order to reduce the HAZ width, it is necessary to reduce a weld heat input, and there are cases where this causes rapid cooling of the heat-affected zone and the generation of martensite. Therefore, the HAZ width may be set to 10 mm or more, 15 mm or more, 18 mm or more, or 20 mm or more. A hardness of the HAZ is also not particularly limited, but for example, hardnesses of the most softened portions at both ends of the HAZ may be specified to 230 HV or more, 250 HV or more, or 280 HV or more.

(3) Reason for Limiting Area Ratio of Martensite Structure in Flash Butt Welded Joint Portion Next, in the present embodiment, the reason for limiting the area ratio of the martensite structure in a region (martensite evaluation region B) of 0 to (⅔)×h from the head top portion outer surface in the longitudinal cross section of the welded joint portion and of ±5 mm in the longitudinal direction from the welding center, to 0.1000% or less will be described. Hereinafter, there are cases where the area ratio of the martensite structure in the martensite evaluation region B of the welded joint portion is simply referred to as "the area ratio of the martensite structure of the welded joint portion".

When the area ratio of the martensite structure in the welded joint portion exceeds 0.1000%, breakage of the welded rail occurs in the drop weight test. Therefore, the area ratio of the martensite structure in the welded joint portion is limited to 0.1000% or less. The martensite evaluation portion, the reason for selection of the evaluation portion, and a method of calculating the area ratio of the martensite structure are as described above. In order to stably suppress breakage of the welded rail, the area ratio of the martensite structure in the welded joint portion is desirably 0.0800% or less, 0.0600% or less, or 0.0500% or less. For example, by applying welding conditions described later to the welded rail, it is possible to reduce the area ratio of the martensite structure to 0.1000% or less.

The smaller the area ratio of the martensite structure in the welded joint portion, the better. However, in a case where the HAZ width is set to 60 mm or less, the welded joint portion is rapidly cooled, and a small amount of martensite is inevitably generated in the welded joint portion. The present inventors confirmed that at least about 0.0006% of martensite is generated in the welded joint portion even if the welding conditions described later are applied to the welded rail. Therefore, the lower limit of the area ratio of the martensite structure in the welded joint portion is set to 0.0006%. For example, the area ratio of the martensite structure in the welded joint portion may be specified to 0.0010% or more, 0.0020% or more, or 0.0050% or more.

It has not been known in previous studies that a small amount of a martensite structure affects mechanical properties of a welded rail. Therefore, in an evaluation of a structure of the welded rail, even if a small amount of the martensite structure is detected, the martensite structure is ignored. However, the present inventors found the effect of a small amount of the martensite structure on the welded rail, and therefore specified the area ratio of the martensite structure in the welded joint portion as described above.

(4) Reason for Limiting Grain Size of Martensite Structures Subjected to Number Control in Flash Butt Welded Joint Portion to 20 to 200 m In the welded rail according to the present embodiment, the number of martensite structures having a grain size of 20 to 200 μm in the martensite evaluation region B of the welded joint portion is controlled. Regarding this requirement, first, the reason why the martensite structures having a grain size of 20 to 200 μm are subjected to number control will be described. Hereinafter, there are cases where the grain size and number of martensite structures in the martensite evaluation region B of the welded joint portion are simply referred to as "the grain size of the martensite structures of the welded joint portion" and "the number of martensite structures of the welded joint portion".

As long as area specification of the martensite structure is satisfied, it is considered that the martensite structures having a grain size of less than 20 μm do not cause rail breakage. From this viewpoint, in the welded rail according to the present embodiment, the number of martensite structures having a grain size of less than 20 m is not particularly limited. On the other hand, there is a concern that martensite structures having a grain size of 20 μm or more cause breakage of the welded rail depending on a circumstance where the martensite structure is generated. Therefore, in the welded rail according to the present embodiment, the number of martensite structures having a grain size of 20 μm or more is subjected to control.

An upper limit of the grain size of the martensite structures subjected to number control is set to 200 m. In other words, the number of martensite structures having a grain size of more than 200 μm is not particularly limited. This is because in a case where martensite structures having a grain size of more than 200 μm are generated, the area ratio of the martensite structures is highly likely to exceed 0.1000%. In other words, in a case where the area ratio of the martensite structures is specified to 0.1000% or less as described above, there is very little risk of breakage of the welded rail due to the martensite structures having a grain size of more than 200 m.

(5) Reasons for Limiting Number of Martensite Structures Having Grain Size of 20 to 200 μm in Flash Butt Welded Joint Portion Next, in the present embodiment, the reason for limiting the number of martensite structures having a grain size of 20 to 200 μm in the martensite evaluation region B of the welded joint portion to 3 to 80 will be described.

As described above, there is a concern that the martensite structures having a grain size of 20-200 μm cause breakage of the welded rail. However, as shown in FIG. 6, when the number of martensite structures having a grain size of 20 to 200 m was 3 to 80, no breakage occurred in the welded rail under the above-described test conditions. The above-described test conditions are to apply a load equal to or greater than that in a usage environment of welded rails to the welded rail. Therefore, when the number of martensite structures having a grain size of 20 to 200 μm is 80 or less, there is a high probability that breakage can be prevented even in a case where the welded rail is actually used. On the other hand, when the number of martensite structures having a grain size of 20 to 200 μm exceeded 80, breakage had occurred in the welded rail. Therefore, the number of martensite structures having a grain size of 20 to 200 μm in the welded joint portion was limited to 80 or less. In order to stably suppress breakage of the welded rail, the number of martensite structures having a grain size of 20 to 200 μm is desirably 70 or less, 60 or less, or 50 or less.

From a viewpoint of preventing breakage of the welded rail, it is preferable that the number of martensite structures having a grain size of 20 to 200 μm is as small as possible. However, considering a capacity of a manufacturing facility for welded rails, it is difficult to reduce the number of martensite structures having a grain size of 20 to 200 μm to less than 3. Therefore, a lower limit of the number of martensite structures having a grain size of 20 to 200 μm is 3. The number of martensite structures having a grain size of 20 to 200 μm may be set to 4 or more, 6 or more, or 10 or more.

(6) Reasons For Limiting Cr Segregation Degree of Welded Joint Portion

By satisfying the specifications for the chemical composition of the rail portion and the specifications for martensite in the welded joint portion described above, excellent fatigue damage resistance and breakage resistance can be imparted to the welded rail. On the other hand, according to the examinations of the present inventors, the fatigue damage resistance and breakage resistance of the welded rail can be further improved by relieving the Cr segregation in the welded joint portion. Next, in the present embodiment, the reason for limiting the Cr segregation degree in the martensite evaluation region B of the welded joint portion to 2.00 or less will be described. Hereinafter, there are cases where the Cr segregation degree in the martensite evaluation region B of the welded joint portion is simply referred to as "the Cr segregation degree of the welded joint portion". As described above, a segregation portion is defined as a region where Cr is concentrated, a bulk Cr concentration is defined as a Cr concentration outside the segregation portion, a segregation portion Cr concentration is defined as an average value of a maximum value of a Cr concentration inside the segregation portion and the bulk Cr concentration, the Cr segregation degree in the segregation portion is defined as a value obtained by dividing the segregation portion Cr concentration by the bulk Cr concentration, and the Cr segregation degree in the martensite evaluation region B of the welded joint portion is defined as an average value of top 20 Cr segregation degrees from a maximum value among Cr segregation degrees in 20 or more segregation portions included in the martensite evaluation region B.

A specific method of specifying the segregation portion, a method of measuring the bulk Cr concentration, and a method of measuring the maximum value of the Cr concentration in the segregation portion are as described above.

As shown in FIG. 8 and Table 3, in the welded rail having a Cr segregation degree of more than 2.00 to 2.40 or less in the welded joint portion, 65 to 80 martensite structures having a grain size of 20 to 200 μm were generated. On the other hand, in the welded rail in which the Cr segregation degree of the welded joint portion was controlled to be in a range of 1.60 to 2.00, the number of martensite structures having a grain size of 20 to 200 μm was in a range of 35 to 50. As a result of the drop weight test conducted on these welded rails, the welded rail was not broken at a dropping weight height of 7500 mm. Therefore, by reducing the Cr segregation degree of the welded joint portion, the breakage resistance was further improved. Further, as shown in FIG. 8 and Table 3, in the welded rail in which the Cr segregation degree of the welded joint portion was controlled to be in a range of 1.30 or more to less than 1.60, the number of martensite structures having a grain size of 20 to 200 μm was reduced to 5 to 15. As a result of the drop weight test conducted on these welded rail, it was confirmed that breakage did not occur even with a dropping weight height of 10,000 mm, and the breakage resistance was significantly improved. Therefore, the Cr segregation degree of the welded joint portion may be limited to 2.00 or less, 1.80 or less, 1.60 or less, or 1.40 or less.

Next, a manufacturing method of a welded rail according to another aspect of the present invention will be described. According to the manufacturing method of a welded rail according to the present embodiment, it is possible to suitably obtain the welded rail excellent in fatigue damage resistance and breakage resistance described above. However, the welded rail that satisfies the above requirements will be excellent in fatigue damage resistance and breakage resistance regardless of the manufacturing method. Therefore, the manufacturing method of a welded rail according to the present embodiment is not particularly limited. The manufacturing method described below does not limit the scope of the welded rail according to the present embodiment, and has to be understood as a desirable example of the manufacturing method.

In order to obtain a welded rail excellent in fatigue damage resistance and breakage resistance, it is preferable to suppress both (1) breakage originating from a fatigue crack occurring from a foot portion of the welded rail, and (2) breakage originating from a brittle crack occurring from an inside of a head portion and a web portion of the welded rail. It is effective to narrow a HAZ width in a welded joint portion in order to suppress breakage originating from a fatigue crack occurring from the foot portion. It is effective to suppress the generation of coarse martensite in the welded joint portion in order to also suppress breakage originating from a brittle crack occurring from the inside of the head portion and from the web portion.

However, the present inventors found that it is extremely difficult to simultaneously achieve a reduction in the HAZ width in the welded joint portion and suppression of the generation of coarse martensite in the welded joint portion. In order to narrow the HAZ width, it is necessary to reduce the amount of heat input during welding of the rail and narrow a width of a region heated to a temperature of the A1 point or higher. However, when the amount of heat input during welding was reduced to suppress a temperature rise in base metal in the vicinity of the welded joint portion, the amount of heat transferred from the welded joint portion to the base metal increased significantly. It was clarified that this significantly increased a cooling rate of the welded joint portion and promoted the generation of martensite.

Therefore, when the present inventors conducted further examinations, it was found that it is possible to achieve both a reduction in the HAZ width and the suppression of martensitic transformation by strictly controlling cooling rates after the completion of welding. It was also found that it is possible to further effectively suppress martensitic transformation during welding by suppressing segregation of Cr in a bloom before hot rolling.

The manufacturing method of a welded rail according to the present embodiment, which is obtained based on the above findings, includes:

a step of casting a bloom having the chemical composition described above;

a step of heating the bloom at 1000° C. to 1350° C., and a step of performing hot rolling on the bloom with a rolling start temperature of 1000° C. to 1350° C. and a rolling end temperature of 750° C. to 1100° C. to obtain a rail;

a step of cooling the rail with a cooling start temperature of 700° C. to 900° C., a cooling stop temperature of 500° C. to 650° C., and an average cooling rate between the cooling start temperature and the cooling stop temperature of 1 to 20° C./sec;

a step of performing flash butt welding on end portions of a plurality of the rails with, in a case of a preheating flash method, a number of times of preheating of 2 to 14 times, a later flash time of 10 to 30 seconds, an average later flash speed of 0.3 mm/sec or faster, a later flash speed immediately before upsetting (for 3 seconds) of 0.5 mm/sec or faster, and an upset load of 50 kN or more, and in a case of a continuous flash method, a flash time of 150 to 250 seconds and a flash speed of 0.10 mm/sec or faster, to obtain a welded rail having a rail portion and a welded joint portion; and a step of cooling the welded joint portion of the welded rail with an average cooling rate of 0.5 to 2.0° C./sec for a head top portion outer surface of the welded joint portion in a temperature range of 800° C. to 400° C., an average cooling rate CR1 of 0.5 to 2.0° C./sec for a jaw portion outer surface and a web portion outer surface in a temperature range of 800° C. to 500° C., an average cooling rate CR2 of 0.4 to 1.6° C./sec for the welded joint portion in a temperature range of 500° C. to 400° C., and a CR2/CR1 of 0.80 or less.

(7) Desirable Flash Butt Welding Conditions

First, in the manufacturing method of a welded rail according to the present embodiment, desirable flash butt welding conditions will be described. Flash butt welding of a rail includes a preheating flash method and a continuous flash method. Either method can be adopted in the manufacturing method of a welded rail according to the present embodiment.

In a case of the preheating flash method, the flash butt welding includes an initial flashing step, a preheating step, a later flashing step, and an upsetting step.

The initial flashing step is a flashing step that begins with a rail at room temperature. In order to facilitate the contact of welding surfaces in the subsequent preheating step, in the initial flashing step, a flash is generated between end surfaces (that is, the welding surfaces) of a pair of rails so that the welding surfaces are adjusted to be perpendicular to a longitudinal direction of the rail. Furthermore, in the initial flashing step, the welding surfaces are heated by resistance heating and arc heating of the flash. A time for performing the initial flashing step, that is, an initial flash time is desirably 10 seconds to 40 seconds.

In the preheating step, a large current is caused to flow through the pair of rails for a certain period of time in a state in which the welding surfaces of the pair of rails that oppose each other are forcibly brought into contact with each other to heat base metal in the vicinity of the welding surfaces by resistance heating. Thereafter, the rails forming the pair are pulled apart. Contact and separation of the welding surfaces are repeated one or more times. The number of times of preheating (contact and separation of the welding surfaces) is preferably set to 2 or more. The number of times of preheating is more preferably 4 times or more, and even more preferably 12 times or more. An upper limit of the number of times of preheating is not particularly specified, but is, for example, 14 times or less, or 13 times or less.

In the later flashing step, first, a flash is partially generated between the opposing welding surfaces, and the welding surfaces are heated by resistance heating and arc heating of this flash. Next, in the later flashing step, the flash generated on a part of the welding surfaces is caused to occur on the entire welding surfaces by increasing a flash speed, and the entire welding surfaces are uniformly heated by the resistance heating and arc heating of this flash. Furthermore, in the later flashing step, oxides generated during the preheating step are scattered and reduced by the flash. The flash speed is a speed at which jigs holding the pair of rails are brought closer to each other.

As a time for performing the later flashing step, that is, a later flash time increases, a HAZ width of the welded joint portion increases. In addition, when s flash speed in the later flashing step, that is, a later flash speed is increased, a heat distribution in the vicinity of the welding surfaces becomes steeper, and as a result, the HAZ width of the welded joint portion is reduced. Therefore, it is desirable to set the later flash time to 10 seconds to 30 seconds, an average later flash speed to 0.3 mm/sec or faster, and a later flash speed immediately before upsetting (for 3 seconds) to 0.5 mm/sec or faster. Here, the average later flash speed is an average flash speed in the entire later flashing step, and the later flash speed immediately before upsetting is an average flash speed for 3 seconds before the start of upsetting. In order to reliably reduce the HAZ width of the welded joint portion, it is desirable that a later flash margin, that is, the amount of erosion of the rail in the later flashing step is 10 mm or more.

In the upsetting step, after the entire welding surfaces are melted by the later flashing step, the welding surfaces are brought into close contact with each other rapidly with a large welding pressure to discharge most of molten metal on the welding surfaces to the outside and apply pressure and deformation to portions heated to a high temperature behind the welding surfaces, thereby forming a joint portion. That is, the oxides generated during welding are discharged by the upsetting step and refined and dispersed, so that it is possible to reduce a probability that the oxides remain on a joint surface as defects that hinder bendability. In addition, discharging most of the molten metal to the outside contributes to reducing the HAZ width of the welded joint portion. In order to reliably reduce the HAZ width of the welded joint portion, it is desirable to set the upset load to 50 kN or more. More preferably, the upset load is desirably set to 65 kN or more.

In the case of the continuous flash method, the flash butt welding does not include a preheating step, but consists of a flashing step and an upsetting step. In the flashing step, as a flash time increases, the HAZ width of the welded joint portion increases. In addition, when a flash speed is increased, a heat distribution in the vicinity of the welding surfaces becomes steeper, and as a result, the HAZ width of the welded joint portion is reduced. Therefore, it is desirable that the flash time is 150 seconds to 250 sec, and the flash speed is 0.10 mm/sec or faster. Conditions for the upsetting step in the case of the continuous flash method may be the same as those in the upsetting step in the case of the preheating flash method described above. In order to reliably reduce the HAZ width of the welded joint portion, it is desirable to perform preheating by pulsed flashing or the like before the flashing step, reduce the flash time, and increase the flash speed.

Regardless of whether the preheating flash method or the continuous flash method is used, an excess metal is formed in the welded joint portion of the welded rail by the upsetting. Therefore, it is preferable to perform trimming on the welded rail to remove the excess metal. Considering work efficiency, trimming is preferably performed after the end of the flash butt welding and before cooling of the welded rail.

(8) Desirable Cooling Conditions after Flash Butt Welding

Next, desirable cooling conditions after the flash butt welding will be described. The cooling conditions after the flash butt welding can be similarly controlled regardless of whether the flash butt welding is the preheating flash method or the continuous flash method.

The welded joint portion is heated to an austenite region. Therefore, hardness of the welded joint portion is reduced without proper cooling. On the other hand, a large amount of martensite structures serving as origin of fracture, is generated inside the head portion of the welded rail, in the web portion, and the like.

First, cooling conditions for securing the hardness of the welded joint portion will be described. Immediately after welding, the welded joint portion in a temperature range of 800° C. to 400° C. is preferably cooled with an average cooling rate in a range of 0.5 to 2.0° C./sec for the head top portion outer surface 1211 of the welded rail shown in FIG. 2. The average cooling rate in the temperature range of 800° C. to 400° C. is a value obtained by dividing 400° C. (that is, the difference between 800° C. and 400° C.) by a time required to lower the temperature from 800° C. to 400° C. When the average cooling rate of the head top portion outer surface in this temperature range is slower than 0.5° C./sec, the hardness of the welded joint portion decreases and wear of a head top portion of the welded rail is accelerated. In addition, when the average cooling rate of the head top portion outer surface in this temperature range exceeds 2.0° C./sec, the hardness of the welded joint portion becomes excessive, and rolling contact fatigue damage resistance of the head top portion of the welded rail decreases. Furthermore, when the average cooling rate of the head top portion outer surface exceeds 2.0° C./sec, the martensite structure coarsens and the number of martensite structures having a grain size of 20 to 200 μm exceeds 80.

The above temperature is preferably measured and controlled by the outer surface of the head top portion of the welded joint after welding with a radiation-type thermometer or a contact-type thermometer. In addition, the cooling rate can be controlled by adjusting the temperature and an elapsed time based on the above temperature measurement.

Next, cooling conditions for reducing the martensite structures generated inside the head portion of the welded rail and in the web portion will be described. Immediately after welding, the welded joint portion in a temperature range of 800° C. to 500° C. is cooled with an average cooling rate CR1 in a range of 0.5 to 2.0° C./sec for the outer surface of the jaw portion 1212 of the welded rail and the outer surface of the web portion 122 of the welded rail shown in FIG. 2. The average cooling rate in the temperature range of 800° C. to 500° C. is a value obtained by dividing 300° C. (that is, the difference between 800° C. and 500° C.) by a time required to lower the temperature from 800° C. to 500° C. When the average cooling rate CR1 of the outer surface of the jaw portion and the web portion in this temperature range is slower than 0.5° C./sec, the hardness of the inside of the head portion and the web portion decreases, and it becomes difficult to secure the minimum strength required as the welded joint portion of the welded rail. In addition, when the average cooling rate CR1 of the outer surface of the jaw portion and the web portion in this temperature range exceeds 2.0° C./sec, even if the cooling rate in a temperature range of lower than 500° C. is controlled, the grain size of the martensite structure coarsens, and the area ratio of the martensite structure exceeds 0.1000%. Control of the cooling rate of the head top portion outer surface is performed within a range of 800° C. to 400° C., while control of the cooling rate of the jaw portion and the web portion is performed within a temperature range of 800° C. to 500° C. This difference in temperature range is due to the difference in the purpose of control of the cooling rates. The purpose of controlling the cooling rate for the head top portion outer surface is to cause sufficient pearlitic transformation to occur and to maintain hardness. On the other hand, the purpose of controlling the cooling rate for the jaw portion and the web portion is to reduce the amount of martensite generated in segregation portions.

Furthermore, in order to reduce the area ratio of the martensite structure generated in the welded joint portion, it is desirable to control, in addition to the average cooling rate CR1 in the cooling immediately after welding (800° C. to 500° C.), the average cooling rate CR2 in the subsequent cooling, that is, in the cooling in a temperature range of 500° C. to 400° C. The average cooling rate CR2 in a temperature range of 500° C. to 400° C. for the welded joint portion is desirably set to 0.4 to 1.6° C./sec. The average cooling rate CR2 in the temperature range of 500 to 400° C. is a value obtained by dividing 100° C. (that is, the difference between 500° C. and 400° C.) by a time required to lower the temperature from 500° C. to 400° C. The average cooling rate in this temperature range is an average cooling rate for the entire outer surfaces of the jaw portion of the welded rail and the web portion of the welded rail. When the average cooling rate CR2 in this temperature range is slower than 0.4° C./sec, the pearlite structure of the welded joint portion is tempered, the hardness of the inside of the head portion and the web portion decreases, and it becomes difficult to secure the minimum strength required as the welded joint portion of the welded rail. In addition, when the average cooling rate CR2 in this temperature range exceeds 1.6° C./sec, the pearlitic transformation is not sufficiently completed, the number of martensite structures having a grain size of 20 to 200 μm generated in the welded joint portion increases, and the damage resistance of the welded rail decreases.

Furthermore, in order to reduce the area ratio of the martensite structure and the number of generated martensite structures having a grain size of 20 to 200 m, a ratio (CR2/CR1) between the average cooling rate (CR1, temperature range: 800° C. to 500° C.) for the entire outer surfaces of the jaw portion of the welded rail and the web portion of the welded rail and the subsequent average cooling rate (CR2, temperature range: 500° C. to 400° C.) is desirably controlled to 0.80 or less. This is because, when CR2/CR1 is 0.80 or less, the cooling rate (CR2) in a low temperature range, which is important for promoting pearlitic transformation, becomes smaller than the cooling rate (CR1) in a high temperature range, pearlitic transformation sufficiently proceeds, the amount of generated martensite decreases.

Therefore, in order to prevent breakage of the welded joint portion, the area ratio of the amount of the martensite structure generated is set to 0.1000% or less, and in order to control the number of martensite structures having a grain size of 20 to 200 m to 5 to 80, each of the cooling rate during the cooling in the high temperature range immediately after the welding and the average cooling rate during the subsequent cooling in the low temperature range is controlled. Furthermore, the ratio (CR2/CR1) between the average cooling rate (CR1) immediately after the welding (800° C. to 500° C.) and the average cooling rate (CR2) during the subsequent cooling (500° C. to 400° C.) is desirably controlled to 0.80 or less.

(9) Desirable Metallographic Structure of Welded Joint Portion

Next, a desirable metallographic structure of the welded joint portion in the present embodiment will be described. The metallographic structure of the welded joint portion is not particularly limited as long as the specifications for martensite described above are satisfied, but by having the structure described below, the fatigue damage resistance and breakage resistance of the welded rail are further improved.

Securing wear resistance is most important at the head portion of the welded rail that comes into contact with the wheel. As a result of an investigation of a relationship between the metallographic structure and wear resistance, it was confirmed that the pearlite structure is the best for securing the wear resistance of the head portion. Therefore, it is desirable that in the head portion (a region from the head top portion outer surface to a depth of ⅓h) of the welded joint portion, a portion other than the martensite structure limited as above has the pearlite structure. As for the other portions, the portion other than the martensite structure limited as above may have a metallographic structure other than the pearlite structure as long as the strength, ductility, and toughness required for the welded rail can be secured.

(10) Manufacturing Conditions for Rail to be Welded

Next, desirable rail manufacturing conditions used in the manufacturing method of a welded rail according to the present embodiment will be described.

First, continuous casting conditions for a bloom, which is a material of the rail, will be described.

In order to control the Cr segregation degree of the flash butt welded joint portion, it is preferable to relieve segregation in the bloom, which is a rolling material of the rail. When the Cr segregation degree is reduced in a bloom stage, the Cr segregation degree of the welded joint portion can also be reduced. It is presumed that this is because a segregation state of the bloom is maintained even after rail rolling is performed, and furthermore, the segregation state of the rail is maintained even after a welding step is performed. A segregation state of an alloying element in the bloom can be appropriately controlled by a known method. For example, examples of means for relieving segregation of elements include performing light rolling reduction on a bloom that is not completely solidified during continuous casting, and performing a soaking diffusion treatment on a bloom that is completely solidified. However, a method that is effective in relieving segregation of one element is not necessarily effective in relieving segregation of another element. For example, Mn is an element that tends to cause a segregation problem, but the conditions for relieving the segregation of Mn are not necessarily effective for relieving segregation of Cr. In order to relieve the segregation of Cr, it is necessary to select suitable means for this purpose.

Next, hot rolling conditions of the bloom will be described.

First, a bloom reheating temperature will be described. When the bloom reheating temperature is lower than 1000° C., hot formability in the rail rolling cannot be secured, and rolling defects occur, so that it is difficult to manufacture the rail. In addition, when the reheating temperature exceeds 1350° C., the steel is melted, and there are cases where it is difficult to manufacture the rail. Therefore, the bloom reheating temperature is desirably in a range of 1000° C. to 1350° C. In a state where the bloom is heated within this temperature range, hot rolling of the bloom is started.

Next, a final rolling temperature in the hot rolling (a temperature when the rail passes a final pass) will be described.

When the final rolling temperature is lower than 750° C., pearlitic transformation starts immediately after completion of the rolling, so that the rail cannot be increased in hardness by a heat treatment after the completion of the rolling, and wear resistance cannot be secured. In addition, when the final rolling temperature exceeds 1100° C., austenite grains become coarse in the rail after the rolling, hardenability is greatly increased, and a bainite structure harmful to wear resistance is generated at the head portion of the rail. In this case, the wear resistance of the welded rail decreases, and the minimum ductility required for the welded rail cannot be secured. Therefore, the final rolling temperature is preferably in a range of 750° C. to 1100° C.

Other hot rolling conditions are not particularly limited. In order to secure the hardness of the head portion of the welded rail, it is sufficient to perform normal groove rolling of the rail while controlling the reheating temperature of the bloom and the final rolling temperature of the rail as described above. For example, after a steel piece is subjected to rough rolling, intermediate rolling is performed in a plurality of passes by a reverse rolling mill, finish rolling is performed in two or more passes by a continuous rolling mill, and a final rolling temperature during final rolling of the finish rolling may be controlled to be in the above temperature range.

Next, heat treatment conditions for the rail after the rolling will be described.

The heat treatment conditions after the hot rolling are in the following ranges of conditions in order to maintain the pearlite structure and control the hardness of the rail head portion.

First, cooling rates will be described. When an average cooling rate of the rail after the hot rolling is slower than 1° C./sec, a pearlitic transformation temperature rises, the rail cannot be increased in hardness, and the wear resistance of the welded rail cannot be secured. In addition, when the average cooling rate of the rail after the hot rolling exceeds 20° C./sec, in this composition system, the bainite structure and the martensite structure are generated in the rail head portion, and the wear resistance of the rail decreases. Therefore, the average cooling rate of the rail after the hot rolling is set to be in a range of 1 to 20° C./sec. The average cooling rate is a value obtained by dividing the difference between a cooling start temperature and a cooling stop temperature, which will be described later, by a cooling time.

Next, the cooling start temperature of the rail will be described. When the cooling start temperature of the rail is lower than 700° C., in this composition system, the pearlite structure is generated in the rail in a high temperature range before accelerated cooling, so that the rail cannot be increased in hardness and the wear resistance of the welded rail cannot be secured. In a case where the cooling start temperature of the rail is lower than 700° C., a pro-eutectoid cementite structure is generated in the rail, and there are cases where the wear resistance of the welded rail decreases. In addition, when the cooling start temperature of the rail exceeds 900° C., the hardenability of the rail is significantly increased, and the bainite structure harmful to wear resistance is generated in the rail head portion, and the wear resistance decreases. Therefore, the cooling start temperature is set to be in a range of 700° C. to 900° C. The cooling start temperature is a rail temperature when accelerated cooling of the rail is started. For example, in a case where means for the accelerated cooling is a cooling medium, the cooling start temperature is a rail temperature when spraying of the cooling medium onto the rail is started.

Next, the cooling stop temperature of the rail will be described. When the cooling stop temperature of the rail exceeds 650° C., pearlitic transformation starts in a high temperature range immediately after the cooling is stopped in this composition system, so that a large amount of pearlite structures having low hardness is generated. As a result, the hardness of the head portion cannot be secured, and it becomes difficult to ensure the wear resistance required for the welded rail. In addition, when accelerated cooling to lower than 500° C. is performed, in this composition system, a large amount of bainite structures harmful to the wear resistance is generated immediately after the cooling stop. As a result, it becomes difficult to secure the wear resistance required for the welded rail. Therefore, the cooling stop temperature is set to be in a range of 500° C. to 650° C. The cooling stop temperature is a rail temperature when the accelerated cooling of the rail is ended. For example, in a case where means for the accelerated cooling is a cooling medium, the cooling start temperature is a rail temperature when the spraying of the cooling medium onto the rail is finished. Even after the accelerated cooling is ended, the rail temperature continues to decrease due to heat dissipation, but the decrease in the rail temperature due to heat dissipation is not included in the accelerated cooling.

The kind of a heat treatment cooling medium for the rail is not particularly limited. In order to impart wear resistance to the rail and to control the hardness of the rail, the cooling rate of the rail during the heat treatment is controlled as described above by air spray cooling, mist cooling, spray cooling with a water and air mixture, or a combination thereof. In addition, in a case where the average cooling rate of the rail in a temperature range of 900° C. to 500° C. is within the above range, the rail after the hot rolling may be naturally cooled to room temperature. In this case, regulations of the cooling start temperature and the cooling stop temperature may be ignored.

(11) Desirable Metallographic Structure of Rail

Next, a desirable metallographic structure of the rail in the present embodiment will be described.

Securing wear resistance is most important for the rail head portion that comes into contact with the wheel. As a result of the investigation of the relationship between the metallographic structure and wear resistance, it was confirmed that the pearlite structure is the best. Therefore, the pearlite structure is desirable for the rail head portion (⅓h from the head top portion outer surface). The other portions may have a metallographic structure other than the pearlite structure as long as the strength and ductility required for the rail can be secured. A configuration of the rail is substantially the same as a configuration of the rail portion of the welded rail.

EXAMPLES

Effects of one aspect of the present invention will be described more specifically with reference to examples. Conditions in the examples are merely one example of conditions adopted to confirm the feasibility and effects of the present invention. The present invention is not limited to this one example of conditions. The present invention can adopt various conditions as long as the object of the present invention is achieved without departing from the gist of the present invention.

Rails having the compositions shown in Tables 4-1 to 4-4 were manufactured and subjected to flash butt welding, whereby welded rails were manufactured. Manufacturing conditions of the welded rails were basically as follows. Changes in conditions are described in Notes of Tables 5-3 and 5-4.

Bloom Manufacturing Conditions

Start of light rolling reduction of bloom: Center solid phase ratio 20%

Rail Manufacturing Conditions

Heating temperature of the bloom (that is, hot rolling start temperature): 1250° C.

Finish rolling temperature of the rail: 950° C.

Cooling start temperature of the rail: 800° C.

Cooling stop temperature of the rail: 550° C.

Average cooling rate of the rail: 5.0° C./sec

Flash Butt Welding Conditions (1) In the case of the preheating flash method (corresponding to "Preheating" described in Tables 5-1 and 5-2)

Number of times of preheating in flash butt welding of the rail: 8 times

Flash time in flash butt welding of the rail: 25 seconds

Average flash speed in flash butt welding of the rail: 0.8 mm/sec

Flash speed immediately before upsetting (for 3 seconds) in flash butt welding of the rail: 2.0 mm/sec Upset load in flash butt welding of the rail: 65 kN (2) In the case of the continuous flash method (corresponding to "Continuous" in Tables 5-1 and 5-2)

Flash time in flash butt welding of the rail: 200 seconds

Average flash speed in flash butt welding of the rail: 0.25 mm/sec

Upset load in flash butt welding of the rail: 60 kN (3) Cooling conditions after welding (common to the preheating flash method and the continuous flash method)

Average cooling rate of the head top portion outer surface of the welded joint portion in a temperature range of 800° C. to 400° C.: 1.0° C./sec Average cooling rate of the outer surfaces of the jaw portion and the web portion of the welded joint portion in a temperature range of 800° C. to 500° C.: 1.0° C./sec Average cooling rate of the welded joint portion in a temperature range of 500° C. to 400° C.: 0.6° C./sec

CR2/CR1: 0.60

However, to some of the welded rails, manufacturing conditions described in "Note" of Tables 5-3 to 5-4 were applied instead of the conditions described above.

In addition, the HAZ width of the welded joint portion of the welded rail, the area ratio of the martensite structure in the martensite evaluation region, the number of martensite structures having a grain size of 20 to 200 m, and the Cr segregation ratio were evaluated, and shown in Tables 5-1 to 5-2. Evaluation methods for these items were as described above. Furthermore, the fatigue damage resistance and breakage resistance of the welded rail were also evaluated by the method described above, and are shown in Tables 5-1 and 5-2. In addition, definition of symbols of the evaluation results shown in the tables is as follows.

Definition of Symbols of Rolling Fatigue Test Results

A: Life of 4 million times or more

B: Life of 3 million times or more to less than 4 million times

C: Life of 2 million times or more to less than 3 million times

X: Life of less than 2 million times

Welded rails with an evaluation result of X were determined as unacceptable for the rolling fatigue test.

Definition of Symbols for Drop Weight Test Results

AA: No rail breakage up to a dropping weight height of 10,000 mm

A: No rail breakage up to a dropping weight height of 75000 mm

B: No rail breakage up to a dropping weight height of 5000 mm

X: Occurrence of breakage

Welded rails with an evaluation result of X were determined as unacceptable for the drop weight test.

TABLE 4-1

|  | C | Si | Mn | P | S | Cr |
|---|---|---|---|---|---|---|
| 1 | 1.00 | 0.70 | 0.80 | 0.018 | 0.015 | 0.60 |
| 2 | 1.20 | 0.70 | 0.80 | 0.018 | 0.015 | 0.60 |
| 3 | 0.75 | 0.70 | 0.80 | 0.018 | 0.015 | 0.60 |
| 4 | 1.00 | 2.00 | 0.80 | 0.018 | 0.015 | 0.60 |
| 5 | 1.00 | 0.10 | 0.80 | 0.018 | 0.015 | 0.60 |
| 6 | 1.00 | 0.70 | 2.00 | 0.018 | 0.015 | 0.60 |
| 7 | 1.00 | 0.70 | 0.10 | 0.018 | 0.015 | 0.60 |
| 8 | 1.00 | 0.70 | 0.80 | 0.025 | 0.015 | 0.60 |
| 9 | 1.00 | 0.70 | 0.80 | 0.018 | 0.025 | 0.60 |
| 10 | 1.00 | 0.70 | 0.80 | 0.018 | 0.015 | 1.50 |
| 11 | 1.00 | 0.70 | 0.80 | 0.018 | 0.015 | 0.10 |
| 12 | 1.00 | 0.70 | 0.80 | 0.018 | 0.015 | 0.60 |
| 13 | 1.00 | 0.70 | 0.80 | 0.018 | 0.015 | 0.60 |
| 14 | 1.00 | 0.70 | 0.80 | 0.018 | 0.015 | 0.60 |
| 15 | 1.00 | 0.70 | 0.80 | 0.018 | 0.015 | 0.60 |
| 16 | 1.00 | 0.70 | 0.80 | 0.018 | 0.015 | 0.60 |
| 17 | 1.00 | 0.70 | 0.80 | 0.018 | 0.015 | 0.60 |
| 18 | 1.00 | 0.70 | 0.80 | 0.018 | 0.015 | 0.60 |
| 19 | 1.00 | 0.70 | 0.80 | 0.018 | 0.015 | 0.60 |
| 20 | 1.00 | 0.70 | 0.80 | 0.018 | 0.015 | 0.60 |
| 21 | 1.00 | 0.70 | 0.80 | 0.018 | 0.015 | 0.60 |
| 22 | 1.00 | 0.70 | 0.80 | 0.018 | 0.015 | 0.60 |
| 23 | 1.00 | 0.70 | 0.80 | 0.018 | 0.015 | 0.60 |
| 24 | 1.00 | 0.70 | 0.80 | 0.018 | 0.015 | 0.60 |
| 25 | 1.00 | 0.70 | 0.80 | 0.018 | 0.015 | 0.60 |
| 26 | 1.00 | 0.70 | 0.80 | 0.018 | 0.015 | 0.60 |
| 26 | 1.00 | 0.70 | 0.80 | 0.018 | 0.015 | 0.60 |
| 27 | 1.00 | 0.70 | 0.80 | 0.018 | 0.015 | 0.60 |
| 28 | 1.00 | 0.70 | 0.80 | 0.018 | 0.015 | 0.60 |

TABLE 4-2

| | Mo | Co | B | Cu | Ni | V | Nb | Ti | Mg | Ca | REM | N | Zr | Al |
|---|---|---|---|---|---|---|---|---|---|---|---|---|---|---|
| 1 | — | — | — | — | — | — | — | — | — | — | — | 0.0038 | — | 0.0022 |
| 2 | — | — | — | — | — | — | — | — | — | — | — | 0.0038 | — | 0.0022 |
| 3 | — | — | — | — | — | — | — | — | — | — | — | 0.0038 | — | 0.0022 |
| 4 | — | — | — | — | — | — | — | — | — | — | — | 0.0038 | — | 0.0022 |
| 5 | — | — | — | — | — | — | — | — | — | — | — | 0.0038 | — | 0.0022 |
| 6 | — | — | — | — | — | — | — | — | — | — | — | 0.0038 | — | 0.0022 |
| 7 | — | — | — | — | — | — | — | — | — | — | — | 0.0038 | — | 0.0022 |
| 8 | — | — | — | — | — | — | — | — | — | — | — | 0.0038 | — | 0.0022 |
| 9 | — | — | — | — | — | — | — | — | — | — | — | 0.0038 | — | 0.0022 |
| 10 | — | — | — | — | — | — | — | — | — | — | — | 0.0038 | — | 0.0022 |
| 11 | — | — | — | — | — | — | — | — | — | — | — | 0.0038 | — | 0.0022 |
| 12 | — | — | — | — | — | — | — | — | — | — | — | 0.0038 | — | 0.0022 |
| 13 | — | — | — | — | — | — | — | — | — | — | — | 0.0038 | — | 0.0022 |
| 14 | — | — | — | — | — | — | — | — | — | — | — | 0.0038 | — | 0.0022 |
| 15 | — | — | — | — | — | — | — | — | — | — | — | 0.0038 | — | 0.0022 |
| 16 | — | — | — | — | — | — | — | — | — | — | — | 0.0038 | — | 0.0022 |
| 17 | — | — | — | — | — | — | — | — | — | — | — | 0.0038 | — | 0.0022 |
| 18 | — | — | — | — | — | — | — | — | — | — | — | 0.0038 | — | 0.0022 |
| 19 | — | — | — | — | — | — | — | — | — | — | — | 0.0038 | — | 0.0022 |
| 20 | — | — | — | — | — | — | — | — | — | — | — | 0.0038 | — | 0.0022 |
| 21 | — | — | — | — | — | — | — | — | — | — | — | 0.0038 | | 0.0022 |
| 22 | — | — | — | — | — | — | — | — | — | — | — | 0.0038 | — | 0.0022 |
| 23 | — | — | — | — | — | — | — | — | — | — | — | 0.0038 | — | 0.0022 |
| 24 | — | — | — | — | — | — | — | — | — | — | — | 0.0038 | — | 0.0022 |
| 25 | — | — | — | — | — | — | — | — | — | — | — | 0.0038 | — | 0.0022 |
| 26 | — | — | — | — | — | — | — | — | — | — | — | 0.0038 | — | 0.0022 |
| 26 | — | — | — | — | — | — | — | — | — | — | — | 0.0038 | — | 0.0022 |
| 27 | — | — | — | — | — | — | — | — | — | — | — | 0.0038 | — | 0.0022 |
| 28 | — | — | — | — | — | — | — | — | — | — | — | 0.0038 | — | 0.0022 |

TABLE 4-3

| | C | Si | Mn | P | S | Cr |
|---|---|---|---|---|---|---|
| 29 | 1.00 | 0.70 | 0.80 | 0.018 | 0.015 | 0.60 |
| 30 | 1.00 | 0.70 | 0.80 | 0.018 | 0.015 | 0.60 |
| 31 | 1.00 | 0.70 | 0.80 | 0.018 | 0.015 | 0.60 |
| 32 | 1.00 | 0.70 | 0.80 | 0.018 | 0.015 | 0.60 |
| 33 | 1.10 | 0.70 | 0.80 | 0.018 | 0.015 | 0.60 |
| 34 | 1.00 | 0.70 | 0.80 | 0.018 | 0.015 | 0.30 |
| 35 | 1.00 | 0.70 | 0.80 | 0.018 | 0.015 | 0.60 |
| 36 | 1.00 | 0.70 | 0.80 | 0.018 | 0.015 | 0.60 |
| 37 | 1.00 | 0.70 | 0.80 | 0.018 | 0.015 | 0.60 |
| 38 | 1.05 | 0.70 | 0.80 | 0.018 | 0.015 | 0.60 |
| 39 | 1.00 | 0.70 | 0.80 | 0.018 | 0.015 | 0.35 |
| 40 | 1.00 | 0.70 | 0.80 | 0.018 | 0.015 | 0.60 |
| 41 | 1.00 | 0.70 | 0.80 | 0.018 | 0.015 | 0.60 |
| 42 | 1.00 | 0.70 | 0.80 | 0.018 | 0.015 | 0.60 |
| 43 | 1.00 | 0.70 | 0.80 | 0.018 | 0.015 | 0.60 |
| 44 | 1.00 | 0.70 | 0.80 | 0.018 | 0.015 | 0.60 |
| 45 | 1.00 | 0.70 | 0.80 | 0.018 | 0.015 | 0.60 |
| 46 | 1.00 | 0.70 | 0.80 | 0.018 | 0.015 | 0.60 |
| 47 | 1.00 | 0.70 | 0.80 | 0.018 | 0.015 | 0.60 |
| 48 | 1.00 | 0.70 | 0.80 | 0.018 | 0.015 | 0.60 |
| 49 | 1.00 | 0.70 | 0.80 | 0.018 | 0.015 | 0.60 |
| 50 | 1.00 | 0.70 | 0.80 | 0.018 | 0.015 | 0.60 |

TABLE 4-3-continued

| | C | Si | Mn | P | S | Cr |
|---|---|---|---|---|---|---|
| 51 | 1.00 | 0.70 | 0.80 | 0.018 | 0.015 | 0.60 |
| 52 | 1.00 | 0.70 | 0.80 | 0.018 | 0.015 | 0.60 |
| 53 | 1.00 | 0.70 | 0.80 | 0.018 | 0.015 | 0.60 |
| 54 | 1.00 | 0.70 | 0.80 | 0.018 | 0.015 | 0.60 |
| 55 | 1.00 | 0.70 | 0.80 | 0.018 | 0.015 | 0.60 |
| 56 | 1.00 | 0.70 | 0.80 | 0.018 | 0.015 | 0.60 |
| 57 | 1.00 | 0.70 | 0.80 | 0.018 | 0.015 | 0.60 |
| 58 | 1.00 | 0.70 | 0.80 | 0.018 | 0.015 | 0.60 |
| 59 | 1.10 | 0.40 | 0.30 | 0.003 | 0.018 | 0.90 |
| 60 | 0.80 | 1.20 | 0.90 | 0.018 | 0.004 | 0.25 |
| 61 | 0.86 | 1.50 | 0.70 | 0.015 | 0.006 | 0.30 |
| 62 | 1.04 | 0.20 | 0.50 | 0.006 | 0.015 | 0.80 |
| 63 | 0.90 | 1.40 | 1.00 | 0.012 | 0.008 | 0.35 |
| 64 | 1.00 | 0.30 | 0.20 | 0.008 | 0.014 | 0.70 |
| 65 | 0.92 | 1.10 | 0.55 | 0.020 | 0.010 | 0.40 |
| 66 | 0.98 | 0.60 | 0.65 | 0.002 | 0.012 | 0.60 |
| 67 | 0.94 | 1.00 | 0.50 | 0.014 | 0.020 | 0.45 |
| 68 | 0.96 | 0.70 | 0.60 | 0.010 | 0.002 | 0.50 |
| 69 | 0.82 | 0.90 | 0.80 | 0.016 | 0.005 | 1.00 |
| 70 | 1.08 | 0.80 | 0.40 | 0.005 | 0.016 | 0.20 |

TABLE 4-4

| | Mo | Co | B | Cu | Ni | V | Nb | Ti | Mg | Ca | REM | N | Zr | Al |
|---|---|---|---|---|---|---|---|---|---|---|---|---|---|---|
| 29 | — | — | — | — | — | — | — | — | — | — | — | 0.0038 | — | 0.0022 |
| 30 | — | — | — | — | — | — | — | — | — | — | — | 0.0038 | — | 0.0022 |
| 31 | — | — | — | — | — | — | — | — | — | — | — | 0.0038 | — | 0.0022 |
| 32 | — | — | — | — | — | — | — | — | — | — | — | 0.0038 | — | 0.0022 |
| 33 | — | — | — | — | — | — | — | — | — | — | — | 0.0038 | — | 0.0022 |
| 34 | — | — | — | — | — | — | — | — | — | — | — | 0.0038 | — | 0.0022 |
| 35 | — | — | — | — | — | — | — | — | — | — | — | 0.0038 | — | 0.0022 |
| 36 | — | — | — | — | — | — | — | — | — | — | — | 0.0038 | — | 0.0022 |
| 37 | — | — | — | — | — | — | — | — | — | — | — | 0.0038 | — | 0.0022 |
| 38 | — | — | — | — | — | — | — | — | — | — | — | 0.0038 | — | 0.0022 |
| 39 | — | — | — | — | — | — | — | — | — | — | — | 0.0038 | — | 0.0022 |
| 40 | — | — | — | — | — | — | — | — | — | — | — | 0.0038 | — | 0.0022 |
| 41 | — | — | — | — | — | — | — | — | — | — | — | 0.0038 | — | 0.0022 |

TABLE 4-4-continued

|    | Mo | Co | B | Cu | Ni | V | Nb | Ti | Mg | Ca | REM | N | Zr | Al |
|----|----|----|----|----|----|----|----|----|----|----|----|----|----|----|
| 42 | — | — | — | — | — | — | — | — | — | — | — | 0.0038 | — | 0.0022 |
| 43 | 0.50 | — | — | — | — | — | — | — | — | — | — | 0.0038 | — | 0.0022 |
| 44 | — | 1.00 | — | — | — | — | — | — | — | — | — | 0.0038 | — | 0.0022 |
| 45 | — | — | 0.0050 | — | — | — | — | — | — | — | — | 0.0038 | — | 0.0022 |
| 46 | — | — | — | 1.00 | — | — | — | — | — | — | — | 0.0038 | — | 0.0022 |
| 47 | — | — | — | — | 1.00 | — | — | — | — | — | — | 0.0038 | — | 0.0022 |
| 48 | — | — | — | — | — | 0.20 | — | — | — | — | — | 0.0038 | — | 0.0022 |
| 49 | — | — | — | — | — | — | 0.0500 | — | — | — | — | 0.0038 | — | 0.0022 |
| 50 | — | — | — | — | — | — | — | 0.0500 | — | — | — | 0.0038 | — | 0.0022 |
| 51 | — | — | — | — | — | — | — | — | 0.0200 | — | — | 0.0038 | — | 0.0022 |
| 52 | — | — | — | — | — | — | — | — | — | 0.0200 | — | 0.0038 | — | 0.0022 |
| 53 | — | — | — | — | — | — | — | — | — | — | 0.0500 | 0.0038 | — | 0.0022 |
| 54 | — | — | — | — | — | — | — | — | — | — | — | 0.0200 | — | 0.0022 |
| 55 | — | — | — | — | — | — | — | — | — | — | — | 0.0020 | — | 0.0022 |
| 56 | — | — | — | — | — | — | — | — | — | — | — | 0.0038 | 0.0200 | 0.0022 |
| 57 | — | — | — | — | — | — | — | — | — | — | — | 0.0038 | — | 1.0000 |
| 58 | — | — | — | — | — | — | — | — | — | — | — | 0.0038 | — | 0.0100 |
| 59 | — | — | — | — | — | — | — | — | — | — | — | 0.0020 | — | 1.0000 |
| 60 | — | — | — | — | — | — | — | — | — | — | — | 0.0200 | — | 0.0100 |
| 61 | — | — | — | — | — | — | — | — | — | — | — | 0.0150 | — | 0.0300 |
| 62 | — | — | — | — | — | — | — | — | — | — | — | 0.0050 | — | 0.5000 |
| 63 | — | — | — | — | — | — | — | — | — | — | — | 0.0140 | — | 0.0350 |
| 64 | — | — | — | — | — | — | — | — | — | — | — | 0.0040 | — | 0.3000 |
| 65 | — | — | — | — | — | — | — | — | — | — | — | 0.0130 | — | 0.0400 |
| 66 | — | — | — | — | — | — | — | — | — | — | — | 0.0080 | — | 0.1000 |
| 67 | — | — | — | — | — | — | — | — | — | — | — | 0.0120 | — | 0.0600 |
| 68 | — | — | — | — | — | — | — | — | — | — | — | 0.0100 | — | 0.0800 |
| 69 | — | — | — | — | — | — | — | — | — | — | — | 0.0160 | — | 0.0200 |
| 70 | — | — | — | — | — | — | — | — | — | — | — | 0.0030 | — | 0.8000 |

TABLE 5-1

|    | FB welding method | HAZ | Area ratio of MS | Number of MS (20 to 200 μm) | Cr segregation ratio | Fatigue damage properties | Breakability | |
|----|----|----|----|----|----|----|----|----|
| 1 | Preheating | 35 | 0.0165 | 70 | 2.20 | B | B | |
| 2 | Preheating | 35 | 0.0113 | 68 | 2.20 | B | B | |
| 3 | Preheating | 35 | 0.0130 | 78 | 2.10 | B | B | |
| 4 | Preheating | 35 | 0.0170 | 70 | 2.10 | B | B | |
| 5 | Preheating | 35 | 0.0160 | 70 | 2.02 | B | B | |
| 6 | Preheating | 35 | 0.0123 | 75 | 2.20 | B | B | |
| 7 | Preheating | 35 | 0.0110 | 65 | 2.05 | B | B | |
| 8 | Preheating | 35 | 0.0130 | 78 | 2.19 | B | B | |
| 9 | Preheating | 35 | 0.0114 | 70 | 2.15 | B | B | |
| 10 | Preheating | 35 | 0.0135 | 80 | 2.20 | B | B | |
| 11 | Preheating | 35 | 0.0105 | 65 | 2.01 | B | B | |
| 12 | Preheating | 60 | 0.0108 | 65 | 2.20 | C | B | Number of times of preheating: 14 times<br>Average later flash speed: 0.3 mm/sec<br>Flash speed immediately before upsetting: 0.5 mm/sec<br>Upset load: 50 kN |
| 13 | Continuous | 60 | 0.0100 | 60 | 2.20 | C | B | Average flash speed: 0.20 mm/sec<br>Upset load: 50 kN |
| 14 | Preheating | 40 | 0.0115 | 70 | 2.20 | C | B | Number of times of preheating: 10 times<br>Average later flash speed: 0.4 mm/sec<br>Flash speed immediately before upsetting: 1.5 mm/sec<br>Upset load: 50 kN |
| 15 | Preheating | 30 | 0.0118 | 72 | 2.20 | B | B | Number of times of preheating: 8 times<br>Average later flash speed: 1.1 mm/sec<br>Flash speed immediately before upsetting: 2.2 mm/sec<br>Upset load: 60 kN |
| 16 | Continuous | 30 | 0.0120 | 75 | 2.20 | B | B | Average flash speed: 0.25 mm/sec<br>Upset load: 60 kN |
| 17 | Preheating | 20 | 0.0125 | 75 | 2.20 | B | B | Number of times of preheating: 6 times<br>Average later flash speed: 1.2 mm/sec<br>Flash speed immediately before upsetting: 2.4 mm/sec<br>Upset load: 65 kN |

TABLE 5-1-continued

| | FB welding method | HAZ | Area ratio of MS | Number of MS (20 to 200 μm) | Cr segregation ratio | Fatigue damage properties | Breakability | |
|---|---|---|---|---|---|---|---|---|
| 18 | Preheating | 15 | 0.0130 | 77 | 2.20 | A | B | Number of times of preheating: 4 times Average later flash speed: 1.4 mm/sec Flash speed immediately before upsetting: 2.6 mm/sec Upset load: 70 kN |
| 19 | Continuous | 15 | 0.0125 | 75 | 2.20 | A | B | Average flash speed: 0.40 mm/sec Upset load: 70 kN |
| 20 | Preheating | 10 | 0.0135 | 80 | 2.20 | A | B | Number of times of preheating: 3 times Average later flash speed: 1.5 mm/sec Flash speed immediately before upsetting: 3.0 mm/sec Upset load: 90 kN |
| 21 | Preheating | 80 | 0.0100 | 60 | 2.20 | X | B | Number of times of preheating: 16 times Average later flash speed: 0.1 mm/sec Flash speed immediately before upsetting: 0.4 mm/sec Upset load: 45 kN |
| 22 | Preheating | 35 | 0.1000 | 65 | 2.20 | B | B | |
| 23 | Preheating | 35 | 0.2000 | 78 | 2.20 | B | X | Cooling rate (CR1, 800° C. to 500° C.): 1.2° C./sec Cooling rate (CR2, 500° C. to 400° C.): 2.4° C./sec CR2/CR1: 2.0 |
| 24 | Preheating | 35 | 0.0140 | 80 | 2.30 | B | B | |
| 25 | Preheating | 35 | 0.0750 | 70 | 2.20 | B | B | |
| 26 | Preheating | 60 | 0.0268 | 90 | 2.20 | B | X | Number of times of preheating: 14 times Average later flash speed: 0.3 mm/sec Flash speed immediately before upsetting: 0.5 mm/sec Upset load: 50 kN Cooling rate (CR1, 800° C. to 500° C.): 1.2° C./sec Cooling rate (CR2, 500° C. to 400° C.): 2.2° C./sec CR2/CR1: 1.8 |
| 27 | Preheating | 35 | 0.0461 | 100 | 2.20 | B | X | Cooling rate (CR1, 800° C. to 500° C.); 1.2° C./sec Cooling rate (CR2, 500° C. to 400° C.): 1.8° C./sec CR2/CR1: 1.5 |
| 28 | Preheating | 15 | 0.0806 | 130 | 2.20 | A | X | Number of times of preheating: 4 times Average later flash speed: 1.4 mm/sec Flash speed immediately before upsetting: 2.6 mm/sec Upset load: 70 kN Cooling rate (CR1, 800° C. to 500° C.): 2.4° C./sec Cooling rate (CR2, 500° C. to 400° C.): 1.2° C./sec CR2/CR1: 0.5 |

TABLE 5-2

| | FB welding method | HAZ | Area ratio of MS | Number of MS (20 to 200 μm) | Cr segregation ratio | Fatigue damage properties | Breakability |
|---|---|---|---|---|---|---|---|
| 29 | Preheating | 35 | 0.0115 | 70 | 2.39 | B | B |
| 30 | Preheating | 35 | 0.0083 | 50 | 1.99 | B | A |
| 31 | Preheating | 35 | 0.0076 | 45 | 1.80 | B | A |
| 32 | Preheating | 35 | 0.0068 | 40 | 1.70 | B | A |
| 33 | Preheating | 35 | 0.0059 | 35 | 1.70 | B | A |
| 34 | Preheating | 35 | 0.0058 | 35 | 1.65 | B | A |
| 35 | Preheating | 35 | 0.0061 | 35 | 1.60 | B | A |
| 36 | Preheating | 35 | 0.0027 | 15 | 1.59 | B | AA |
| 37 | Preheating | 35 | 0.0023 | 13 | 1.50 | B | AA |
| 38 | Preheating | 35 | 0.0018 | 10 | 1.50 | B | AA |
| 39 | Preheating | 35 | 0.0017 | 10 | 1.45 | B | AA |
| 40 | Preheating | 35 | 0.0018 | 10 | 1.40 | B | AA |
| 41 | Preheating | 35 | 0.0010 | 5 | 1.35 | B | AA |
| 42 | Preheating | 35 | 0.0006 | 3 | 1.30 | B | AA |
| 43 | Preheating | 35 | 0.0165 | 70 | 2.20 | B | B |
| 44 | Preheating | 35 | 0.0165 | 70 | 2.20 | B | B |
| 45 | Preheating | 35 | 0.0165 | 70 | 2.20 | B | B |
| 46 | Preheating | 35 | 0.0165 | 70 | 2.20 | B | B |
| 47 | Preheating | 35 | 0.0165 | 70 | 2.20 | B | B |
| 48 | Preheating | 35 | 0.0165 | 70 | 2.20 | A | B |
| 49 | Preheating | 35 | 0.0165 | 70 | 2.20 | A | B |

TABLE 5-2-continued

| | FB welding method | HAZ | Area ratio of MS | Number of MS (20 to 200 μm) | Cr segregation ratio | Fatigue damage properties | Breakability |
|---|---|---|---|---|---|---|---|
| 50 | Preheating | 35 | 0.0165 | 70 | 2.20 | A | B |
| 51 | Preheating | 35 | 0.0165 | 70 | 2.20 | A | B |
| 52 | Preheating | 35 | 0.0165 | 70 | 2.20 | A | B |
| 53 | Preheating | 35 | 0.0165 | 70 | 2.20 | A | B |
| 54 | Preheating | 35 | 0.0165 | 70 | 2.20 | A | B |
| 55 | Preheating | 35 | 0.0165 | 70 | 2.20 | B | B |
| 56 | Preheating | 35 | 0.0165 | 70 | 2.20 | B | B |
| 57 | Preheating | 35 | 0.0165 | 70 | 2.20 | B | B |
| 58 | Preheating | 35 | 0.0165 | 70 | 2.20 | B | B |
| 59 | Preheating | 35 | 0.0167 | 80 | 2.10 | B | B |
| 60 | Preheating | 35 | 0.0109 | 60 | 2.10 | B | B |
| 61 | Preheating | 20 | 0.0110 | 60 | 2.05 | B | B |
| 62 | Preheating | 20 | 0.0142 | 75 | 2.05 | B | B |
| 63 | Preheating | 25 | 0.0111 | 60 | 2.10 | B | B |
| 64 | Preheating | 25 | 0.0142 | 75 | 2.10 | B | B |
| 65 | Preheating | 35 | 0.0132 | 65 | 2.05 | B | B |
| 66 | Preheating | 35 | 0.0119 | 70 | 2.05 | B | B |
| 67 | Preheating | 30 | 0.0138 | 65 | 2.20 | B | B |
| 68 | Preheating | 30 | 0.0126 | 70 | 2.20 | B | B |
| 69 | Preheating | 25 | 0.0156 | 60 | 2.30 | B | B |
| 70 | Preheating | 25 | 0.0271 | 75 | 2.30 | B | B |

Example 21 is an example in which the average later flash speed was too small and the HAZ width (see the "HAZ width" field in the table) of the welded joint portion exceeded the range of the invention. In Example 21, fatigue damage properties did not meet the acceptance criteria.

Example 23 is an example in which the average cooling rate CR2 of the welded joint portion in a temperature range of 500° C. to 400° C. and CR2/CR1 were too large and the area ratio (see "MS area ratio" in the table) of the martensite structure in the martensite evaluation region exceeded the range of the invention. In Example 23, the breakability did not meet the acceptance criteria.

Examples 26 and 27 are examples in which the average cooling rate CR2 of the welded joint portion in a temperature range of 500° C. to 400° C. and CR2/CR1 were too large, so that the number of martensite structures having a grain size of 20 to 200 μm in the martensite evaluation region exceeded the range of the invention. In Examples 26 and 27, the breakability did not meet the acceptance criteria. Example 28 is an example in which average cooling rate CR1 of the head top portion outer surface of the welded joint portion in a temperature range of 800° C. to 400° C. was too large, so that the number of martensite structures having a grain size of 20 to 200 μm in the martensite evaluation region exceeded the range of the invention. In Example 25, the breakability did not meet the acceptance criteria.

On the other hand, in all of the examples within the range of the present invention, fatigue damage properties and breakability exceeded the acceptance criteria. That is, according to the present invention, by improving the fatigue damage resistance and breakage resistance of the welded joint portion, the service life of the welded rail could be significantly improved.

BRIEF DESCRIPTION OF THE REFERENCE SYMBOLS

1: welded rail
11: welded joint portion
111: heat-affected zone (HAZ)
12: rail portion
121: head portion of welded rail (head portion)

1211: head top portion outer surface of welded rail (head top portion outer surface)
1212: jaw portion of welded rail (jaw portion)
122: web portion of welded rail (web portion)
123: foot portion of welded rail (foot portion)
A: welding center
B: martensite evaluation region
2: sleeper
3: wheel
4: motor
5: load stabilizer
What is claimed is:

1. A welded rail comprising:

a plurality of rail portions having a head portion and a web portion and having a height h; and a welded joint portion that joins the rail portions together, wherein the rail portion contains, as a chemical composition, by unit mass %, C: 0.75% to 1.20%,
Si: 0.10% to 2.00%,
Mn: 0.10% to 2.00%,
Cr: 0.10% to 1.50%,
$P \leq 0.0250\%$,
$S \leq 0.0250\%$,
Mo: 0% to 0.50%,
Co: 0% to 1.00%,
B: 0% to 0.0050%,
Cu: 0% to 1.00%,
Ni: 0% to 1.00%,
V: 0% to 0.50%,
Nb: 0% to 0.0500%,
Ti: 0% to 0.0500%,
Mg: 0% to 0.0200%,
Ca: 0% to 0.0200%,
REM: 0% to 0.0500%,
N: 0% to 0.0200%,
Zr: 0% to 0.0200%,
Al: 0% to 1.00%, and
a remainder consisting of Fe and impurities, a HAZ width of the welded joint portion is 60 mm or less, in a region of 0 to (2/3)×h from a head top portion outer surface in a cross section of the welded joint portion which is parallel to a longitudinal direction and an up-down direction of the welded rail and passes through a center of the welded joint portion and of +5 mm in the longitudinal direction from a welding center, an area ratio of a martensite structure is 0.0006% to 0.1000%, and in the region, the number of martensite structures having a grain size of 20 to 200 μm is 3 to 80.

2. The welded rail according to claim 1, wherein a Cr segregation degree in the region of the welded joint portion is 2.00 or less.

3. The welded rail according to claim 1, wherein the rail portion further contains one or more of, as the chemical composition, by unit mass %, Mo: 0.01% to 0.50%, Co: 0.01% to 1.00%, B: 0.0001% to 0.0050%, Cu: 0.01% to 1.00%, Ni: 0.01% to 1.00%, V: 0.01% to 0.50%, Nb: 0.0010% to 0.0500%, Ti: 0.0030% to 0.0500%, Mg: 0.0005% to 0.0200%, Ca: 0.0005% to 0.0200%, REM: 0.0005% to 0.0500%, N: 0.0020% to 0.0200%, Zr: 0.0001% to 0.0200%, and Al: 0.0100% to 1.00%.

4. The welded rail according to claim 2, wherein the rail portion further contains one or more of, as the chemical composition, by unit mass %, Mo: 0.01% to 0.50%, Co: 0.01% to 1.00%, B: 0.0001% to 0.0050%, Cu: 0.01% to 1.00%, Ni: 0.01% to 1.00%, V: 0.01% to 0.50%, Nb: 0.0010% to 0.0500%, Ti: 0.0030% to 0.0500%, Mg: 0.0005% to 0.0200%, Ca: 0.0005% to 0.0200%, REM: 0.0005% to 0.0500%, N: 0.0020% to 0.0200%, Zr: 0.0001% to 0.0200%, and Al: 0.0100% to 1.00%.

\* \* \* \* \*